(12) United States Patent
Xu et al.

(10) Patent No.: US 11,288,111 B2
(45) Date of Patent: Mar. 29, 2022

(54) ENTROPY-BASED CLASSIFICATION OF HUMAN AND DIGITAL ENTITIES

(71) Applicant: Oracle International Corporation, Redwood Shores, CA (US)

(72) Inventors: Brian H. Xu, San Jose, CA (US); Christopher James Ries, Saratoga, CA (US); Chao Feng, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 8 days.

(21) Appl. No.: 16/750,863

(22) Filed: Jan. 23, 2020

(65) Prior Publication Data
US 2020/0334095 A1 Oct. 22, 2020

Related U.S. Application Data

(60) Provisional application No. 62/835,983, filed on Apr. 18, 2019, provisional application No. 62/835,993, (Continued)

(51) Int. Cl.
| | |
|---|---|
| *G06F 11/07* | (2006.01) |
| *G06F 11/32* | (2006.01) |
| *G06N 3/02* | (2006.01) |
| *G06F 17/18* | (2006.01) |
| *G06F 40/284* | (2020.01) |
| *G06N 3/08* | (2006.01) |
| *H04L 29/06* | (2006.01) |

(52) U.S. Cl.
CPC ........ *G06F 11/0709* (2013.01); *G06F 11/327* (2013.01); *G06F 17/18* (2013.01); *G06F 40/284* (2020.01); *G06N 3/02* (2013.01); *G06N 3/08* (2013.01); *H04L 63/1425* (2013.01)

(58) Field of Classification Search
CPC .... G06F 11/0709; G06F 11/327; G06F 17/18; G06F 40/284; G06F 11/076; G06F 11/0772; G06N 3/08; G06N 3/02; H04L 63/1425
See application file for complete search history.

(56) References Cited

U.S. PATENT DOCUMENTS

| | | | |
|---|---|---|---|
| 9,805,193 B1 * | 10/2017 | Salsamendi ........... | G06F 21/566 |
| 10,417,335 B2 * | 9/2019 | Jaroch ................... | G06F 40/205 |

(Continued)

OTHER PUBLICATIONS

Li et al., "Generating Interpretable Network Asset Clusters for Security Analytics", IEEE International Conference on Big Data (Big Data), Jun. 2018, pp. 2972-2979.

(Continued)

*Primary Examiner* — Javier O Guzman
(74) *Attorney, Agent, or Firm* — Kilpatrick Townsend & Stockton

(57) ABSTRACT

A method of distinguishing between human and computer actions in a cloud environment includes receiving one or more actions from a monitored cloud environment; identifying a text string associated with the one or more actions; calculating an entropy value for the text string; determining whether the text string is bot-generated based at least in part on the entropy value; and determining whether to generate an alert based at least in part on a result of determining whether the text string is bot-generated.

20 Claims, 19 Drawing Sheets

Related U.S. Application Data filed on Apr. 18, 2019, provisional application No. 62/835,980, filed on Apr. 18, 2019.

(56) References Cited

U.S. PATENT DOCUMENTS

| | | | |
|---|---|---|---|
| 10,623,429 B1* | 4/2020 | Vines | H04L 41/14 |
| 10,715,533 B2* | 7/2020 | Iwanir | H04L 63/1425 |
| 2003/0167402 A1 | 9/2003 | Stolfo et al. | |
| 2003/0212543 A1* | 11/2003 | Epstein | G06F 40/211 |
| | | | 704/9 |
| 2007/0245420 A1* | 10/2007 | Yong | H04L 43/00 |
| | | | 726/23 |
| 2008/0072305 A1* | 3/2008 | Casado | H04W 4/029 |
| | | | 726/11 |
| 2011/0321175 A1* | 12/2011 | Slater | G06F 21/552 |
| | | | 726/28 |
| 2012/0240231 A1* | 9/2012 | Sohn | G06F 21/564 |
| | | | 726/24 |
| 2014/0347182 A1* | 11/2014 | Poursohi | G06N 3/008 |
| | | | 340/540 |
| 2015/0319182 A1* | 11/2015 | Natarajan | H04L 63/145 |
| | | | 726/24 |
| 2016/0308858 A1* | 10/2016 | Nordstrom | H04L 9/3228 |
| 2017/0093886 A1* | 3/2017 | Ovcharik | H04L 9/002 |
| 2018/0004948 A1* | 1/2018 | Martin | G06F 21/566 |
| 2018/0018302 A1* | 1/2018 | Vasiltschenko | G06F 40/106 |
| 2018/0077180 A1* | 3/2018 | Zhang | G06F 21/566 |
| 2018/0248895 A1* | 8/2018 | Watson | G06N 3/08 |
| 2018/0262520 A1* | 9/2018 | Xu | H04L 63/1416 |
| 2019/0098037 A1 | 3/2019 | Shenoy, Jr. et al. | |
| 2019/0098043 A1* | 3/2019 | Banerjee | H04L 63/1425 |
| 2019/0109870 A1* | 4/2019 | Bedhapudi | H04L 63/0428 |
| 2019/0347418 A1* | 11/2019 | Strogov | G06F 16/122 |
| 2020/0259861 A1* | 8/2020 | Margel | H04L 63/1425 |

OTHER PUBLICATIONS

Weller-Fahy et al., A Survey of Distance and Similarity Measures Used within Network Intrusion Anomaly Detection, IEEE Communication Surveys & Tutorials, vol. 17, No. 1, First Quarter 2015, pp. 70-91.

International Application No. PCT/US2020/028105, International Search Report and Written Opinion dated May 27, 2020, 12 pages.

International Application No. PCT/US2020/028108, International Search Report and Written Opinion dated May 27, 2020, 12 pages.

* cited by examiner

Configuration Controls

| | | |
|---|---|---|
| VCNs with no Inbound Security Lists | Tenancy Administrator privilege granted to additional IAM group | Storage Block Volume is not attached | Security list allows unrestricted traffic to non-public port |
| Public bucket is found | Load balancer SSL certificate expires in 45 Days | KMS key not rotated | IAM Policy grants too many privileges |
| Group of Administrators has too many members | DB System has public IP address (Bare Metal | VM | Exadata) | Compute Instance is running image without supported tags | Bucket is not encrypted with KMS key |
| Automatically backup databases (Bare Metal | VM) | Administrator user has API keys configured | IAM Key older than 90 days | Compute Instance has a public IP Address |

FIG. 1C

| | Day 1 | Day 2 | Day 3 | Day 4 | ... | Day 89 | Day 90 | Day 91 | Day 92 |
|---|---|---|---|---|---|---|---|---|---|
| Send Email | 22 | 25 | 19 | 28 | ..... | 21 | 18 | 23 | 23 |
| View 1 | 6 | 4 | 7 | 5 | ..... | 4 | 6 | 6 | 4 |
| Add Mail Contact | 1 | 0 | 3 | 2 | ..... | 1 | 0 | 0 | 1 |
| Delete Comment | 3 | 0 | 1 | 2 | ..... | 3 | 0 | 1 | 2 |
| Change Password | 0 | 1 | 0 | 0 | ..... | 0 | 1 | 0 | 0 |
| Approve Access | 0 | 0 | 0 | 0 | ..... | 0 | 0 | 0 | 0 |
| Disable Account | 0 | 0 | 0 | 0 | ..... | 0 | 0 | 0 | 0 |
| Create New Tenant | 0 | 0 | 0 | 0 | ..... | 0 | 0 | 0 | 0 |
| Update | 12 | 22 | 17 | 6 | ..... | 12 | 22 | 17 | 6 |
| Add Mail Contact | 2 | 0 | 1 | 2 | ..... | 2 | 0 | 1 | 2 |

FIG. 3A

Text String Entropy $$H(X) = \sum_{i=1}^{n} p(x_i) I(x_i) = \sum_{i=1}^{n} p(x_i) \log_b \frac{1}{p(x_i)} = -\underbrace{\sum_{i=1}^{n} p(x_i) \log_b p(x_i)}_{602},$$

| Bot-Generated String | Entropy |
|---|---|
| o365_o365_prj0013517-upgradeeai-sap984@edponcloud.onmicrosoft.com | 4.67953 |
| ocid1.saml2idp.oc1..aaaaaaaadvzslf2wcw7djnhak5h5a2kfg52xrpzglwrm5whdrmom22fghma<br>loic.lefevre@oracle.com | 4.508988 |
| 7772c9d9-b6b6-4192-b150-d1090eef8835@edponcloud.onmicrosoft.com | 4.59181 |

FIG. 7

| Bot-Generated String | Entropy |
|---|---|
| abc@certi.com | 3.33467 |
| cloud user1 | 3.27761 |
| o365microsoft.com | 3.38158 |

802 — Bot-Generated String column
804 — Entropy column

FIG. 8

Def Entropy(string):

log2 = lambda x:math.log(x)/math
count = { }
H = 0

902 ⸺
```
for letter in string
    try:
        count[letter] += 1
    except:
        count[letter] = 1
``` stringlen=len(string)

360 ⸺
```
for k,v in count.items():
    P = 1.0*v/stringlen
    H += P*log2(freq)
```

H *= -1
return H

FIG. 9

ENTROPY-BASED CLASSIFICATION OF HUMAN AND DIGITAL ENTITIES

CROSS-REFERENCES TO RELATED APPLICATIONS

This application claims the benefit of the following U.S. Provisional applications, each of which is incorporated herein by reference:

U.S. Provisional Application 62/835,980, titled DETECTING BEHAVIOR ANOMALIES OF CLOUD USERS, filed on Apr. 18, 2019;

U.S. Provisional Application 62/835,993, titled ENTROPY-BASED CLASSIFICATION OF HUMAN AND DIGITAL ENTITIES, filed on Apr. 18, 2019; and U.S. Provisional Application 62/835,983, titled DETECTING BEHAVIOR ANOMALIES OF CLOUD USERS FOR OUTLIER ACTIONS, filed on Apr. 18, 2019.

This application is also related to the following commonly-assigned U.S. Nonprovisional Applications filed on the same date as the present application, each of which is incorporated herein by reference:

U.S. Nonprovisional application Ser. No. 16/750,852, titled DETECTING BEHAVIOR ANOMALIES OF CLOUD USERS, filed on Jan. 23, 2020; and U.S. Nonprovisional application Ser. No. 16/750,874, titled DETECTING BEHAVIOR ANOMALIES OF CLOUD USERS FOR OUTLIER ACTIONS, filed on Jan. 23, 2020.

BACKGROUND

Cloud security involves the protection of customer data, applications, and infrastructures associated with cloud computing. Many aspects of security for cloud environments are similar to those for on-premises hardware and software. This is true for public clouds, private clouds, and/or hybrid clouds. Security concerns that are of particular interest in the cloud environment include unauthorized data exposure and leaks, weak access controls, susceptibility to attacks, availability disruptions, denial of service attacks, and so forth. However, instead of managing physical servers and storage devices, cloud security systems often rely on software-based security tools to monitor and protect the flow of information into and out of cloud resources. Therefore, cloud computing security IP may include a broad set of policies, technologies, applications, services, data, and other associated cloud computing infrastructures.

Security issues for cloud computing can be broadly segregated into two broad categories: (1) security issues faced by customers who host applications and store data on the cloud, and (2) security issues faced by cloud providers themselves. Security issues for cloud customers may aim to prevent user privilege escalation, which describes a situation where a cloud user is appropriated a limited set of permissions, but then escalates their activities beyond those permissions for malicious purposes, such as using insecure APIs, exploiting system and/or application vulnerabilities, using weak identities, infiltrating credential access management, and so forth.

BRIEF SUMMARY

In some embodiments, a method of distinguishing between human and computer actions in a cloud environment may include receiving one or more actions from a monitored cloud environment; identifying a text string associated with the one or more actions; calculating an entropy value for the text string; determining whether the text string is bot-generated based at least in part on the entropy value; and determining whether to generate an alert based at least in part on a result of determining whether the text string is bot-generated.

In some embodiments, a non-transitory computer-readable medium may include instructions that, when executed by one or more processors, cause the one or more processors to perform operations that may include receiving one or more actions indication from a monitored cloud environment; identifying a text string associated with the one or more actions; calculating an entropy value for the text string; determining whether the text string is bot-generated based at least in part on the entropy value; and determining whether to generate an alert based at least in part on a result of determining whether the text string is bot-generated.

In some embodiments, a system may include one or more processors and one or more memory devices including instructions that, when executed by the one or more processors, cause the one or more processors to perform operations that may include receiving one or more actions from a monitored cloud environment; identifying a text string associated with the one or more actions; calculating an entropy value for the text string; determining whether the text string is bot-generated based at least in part on the entropy value; and determining whether to generate an alert based at least in part on a result of determining whether the text string is bot-generated.

In any embodiments, any, none, or all of the following features may included in any combination and without limitation. The entropy value of the text string may be calculated by calculating a probability of occurrence for each token in the text string. The entropy value of the text string may be further calculated by calculating the base-2 logarithm of the probability of occurrence for each token in the text string. The entropy value of the text string may further be calculated by multiplying a result of the base-2 logarithm by the probability of occurrence for each token in the text string. The entropy value of the text string may further be calculated by aggregating results of multiplying the base-2 logarithm by the probability of occurrence to generate an overall entropy measure for the text string. Identifying the text string associated with the one or more actions may include extracting a substring from a request in at least one of the one or more actions. Identifying the text string associated with the one or more actions may include removing text from a white list of common text from the text string before calculating the entropy value. Identifying the text string associated with the one or more actions may include combining text strings from each of the one or more actions together to form the text string. Determining whether the text string is bot-generated based at least in part on the entropy value may include comparing the entropy value to a predetermined threshold; and determining that the text string is bot-generated if the entropy value exceeds the predetermined threshold. The predetermined threshold may be determined based on a type of the one or more actions. The predetermined threshold may be determined based on a rate at which the one or more actions occur. The predetermined threshold may be determined based on a type of resource on which the one or more actions are performed. Determining whether the text string is bot-generated based at least in part on the entropy value may include providing the one or more actions and the entropy value to a neural network; and receiving an output of the neural network indicating whether the text string is bot-generated. The method/operations may further includes altering a baseline threshold used to detect threats in the cloud environment based on the entropy value. The method/operations may further include altering an upper threshold used to detect threats in the cloud environment based on the entropy value. The method/operations may also include determining that the one or more actions are executed against a same resource. The method/operations may further include determining that the one or more actions are executed by a same user. Determining whether to generate the alert may include determining that the system had determined not to generate the alert based on a similarity score being compared to a baseline threshold and an upper threshold; and causing the system to generate the alert based on the entropy value.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 1C illustrates some of the different configuration controls that may be monitored by the CASB, according to some embodiments.

FIG. 3A illustrates actions taken by a particular user as stored and analyzed over time by the CASB.

FIG. 6A illustrates an example equation 600 for calculating the entropy of a text string, according to some embodiments.

FIG. 7 illustrates a table of bot-generated text strings and their associated entropy values, according to some embodiments.

FIG. 8 illustrates a table of human-generated text strings and their associated entropy values, according to some embodiments.

FIG. 9 illustrates pseudocode for calculating the entropy of text strings, according to some embodiments.

DETAILED DESCRIPTION

Described herein are embodiments for detecting behavioral anomalies of cloud users by combining cosine similarity scores with cybersecurity domain expertise. As tested in a production cloud environment, this technique is capable of detecting behavioral anomalies of cloud users without any labeled data sets. This unsupervised machine learning approach does not require a priori knowledge of normal and/or abnormal behaviors or actions. This approach also does not require user information such as privilege level, job function, or action permissions. This approach is designed to successfully detect (1) cloud users' abnormal actions, including user privilege escalation behaviors, and (2) excessive privilege actions across all cloud tenants in various cloud applications or services. As described in greater detail below, a peer group analysis may be employed to identify behavioral anomalies.

Figure 1A:
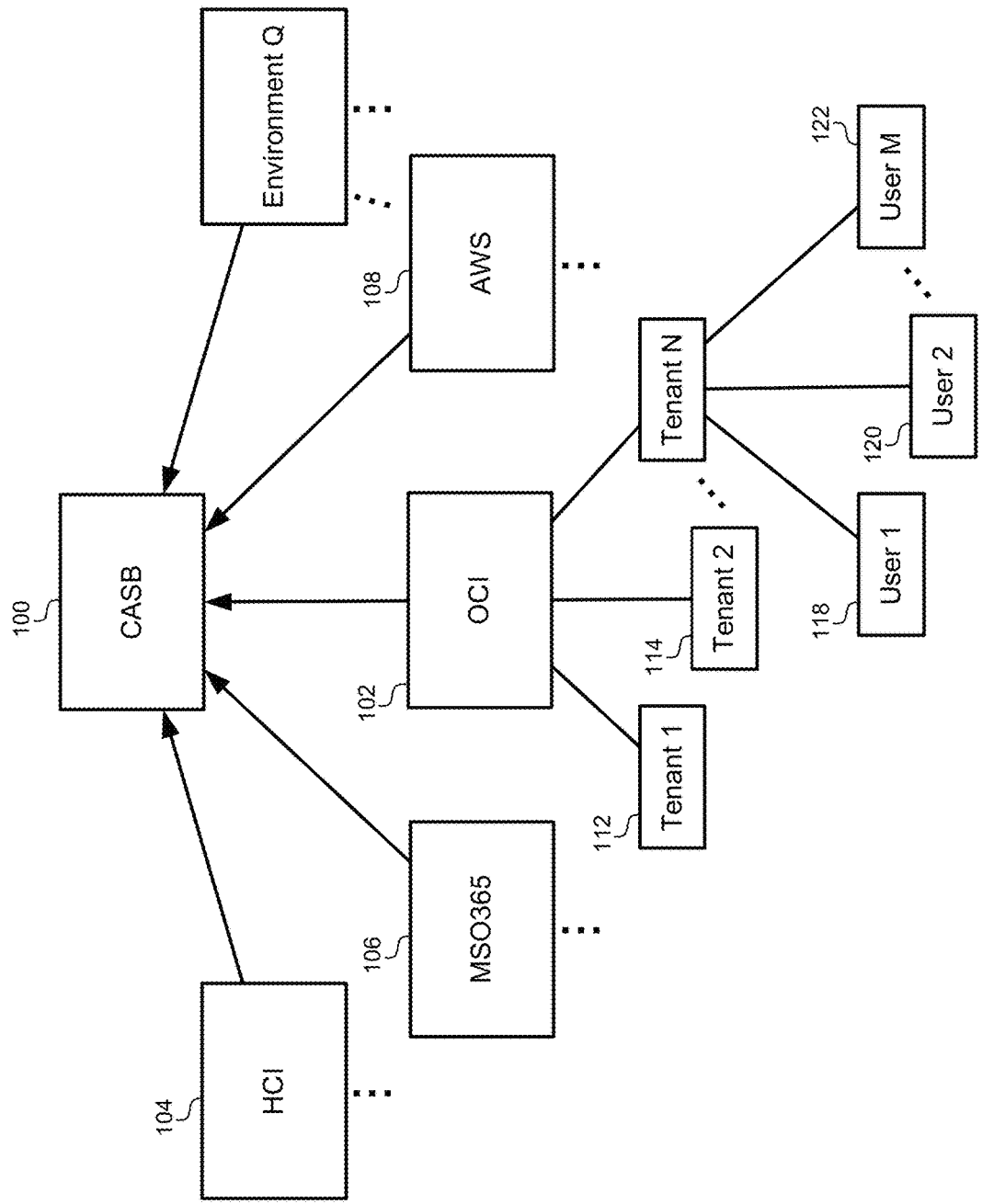
FIG. 1A illustrates a Cloud Access Security Broker (CASB) that can be used to identify behavioral anomalies in users for a number of different cloud customers, according to some embodiments.

FIG. 1A illustrates a Cloud Access Security Broker (CASB) 100 that can be used to identify behavioral anomalies in users for a number of different cloud customers, according to some embodiments. The CASB 100 is a cloud service that may provide visibility into an entire cloud stack and serve as a security automation tool. The CASB 100 may provide real-time continuous monitoring of activity across the plurality of different cloud environments simultaneously. This may include monitoring configurations and transactions that identify behavioral anomalies and patterns of fraud or breach across cloud applications. A set of security policies can be used to discover and prevent unwanted actions on sensitive content in cloud environments. These security policies allow administrators to configure the CASB 100 to audit, alert, encrypt, and/or quarantine content in real time in response to detected security threats. In addition to detecting threats, the CASB 100 may also be configured to predict and visualize security threats before they occur by providing a dashboard that shows current activity along with predicted trends in activity. Once anomalies are detected by the CASB 100, the system can take action and conduct forensics to isolate, analyze, and contain known security threats.

The CASB 100 may monitor a plurality of different cloud environments. For example, the CASB 100 may interface with the Oracle Cloud Infrastructure® (OCI) 102 that can provide compute instances, networking, data storage, databases, cloud interconnections, edge services, load-balancing, governance policies, data streaming, resource management, and other cloud-based services. Additionally, the CASB 100 may also interact with other cloud environments, such as Oracle's Human Capital Management® (HCI) 104 suite, Amazon Web Services (AWS) 108, Microsoft Office 365 (MSO365) 106, and/or the like.

To monitor these different cloud environments, the CASB 100 may be configured to receive real-time data monitoring streams for thousands of individual users. Assuming that there are Q different cloud environments being monitored by the CASB 100, and each of the Q environments includes N tenants, this may provide the simultaneous monitoring of Q×N tenants. Furthermore, if each tenant has at least M users, the CASB 100 may simultaneously monitor at least Q×N×M users.

Figure 1B:
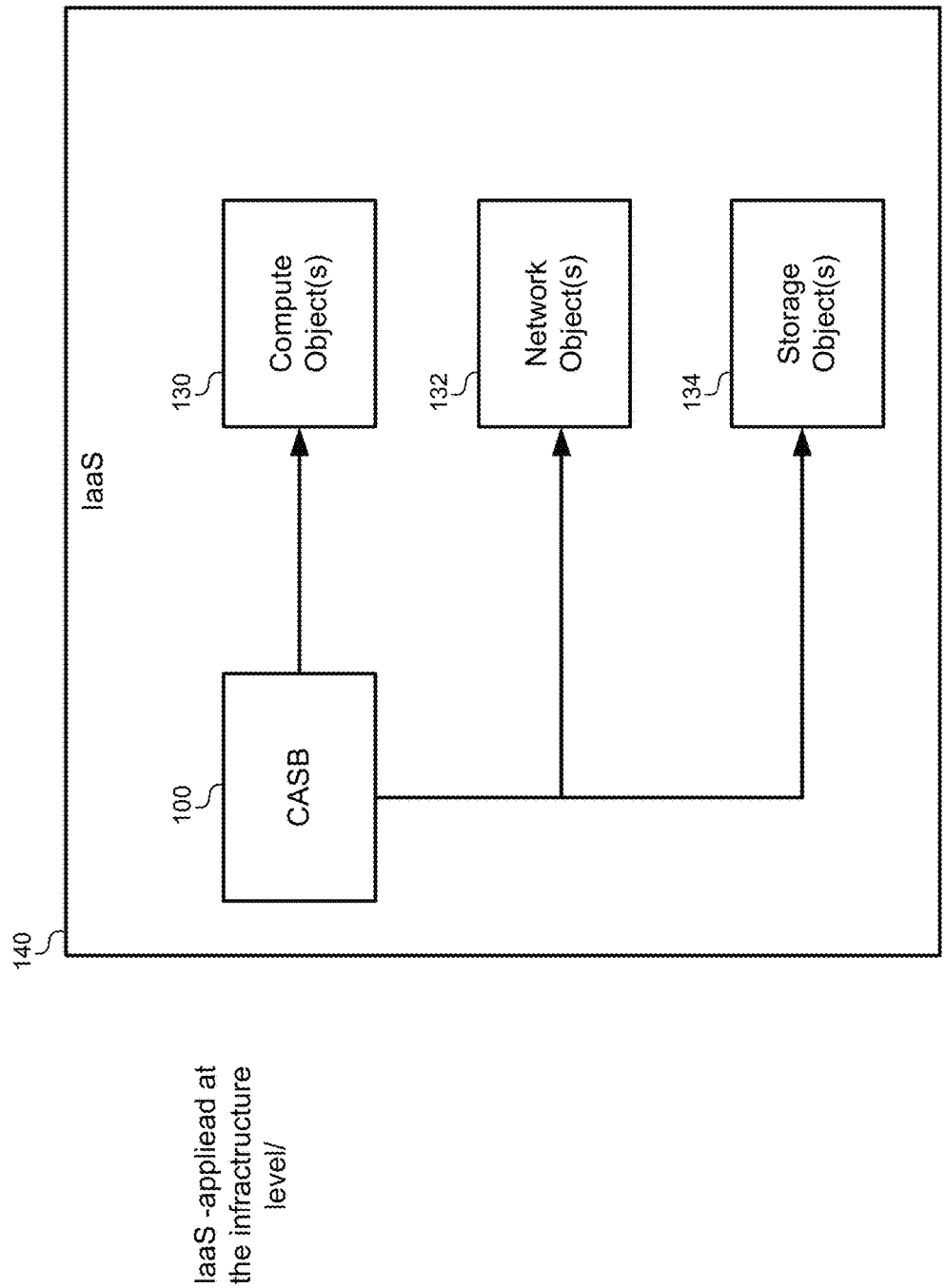
FIG. 1B illustrates an alternate architecture for implementing the CASB in an Infrastructure as a Service (IaaS) system, according to some embodiments.

FIG. 1B illustrates an alternate architecture for implementing the CASB 100 in an Infrastructure as a Service (IaaS) system, according to some embodiments. In contrast to FIG. 1A, this architecture places the CASB 100 within the infrastructure of a particular cloud service. With the CASB 100 as part of the infrastructure, the CASB 100 may have more access to specific types of actions that take place within the infrastructure.

For example, in the multi-cloud environment of FIG. 1A, the CASB 100 monitored events that occurred at the application level in each of the different cloud environments. In the infrastructure-based architecture of FIG. 1B, the CASB 100 may instead receive events that occur at the resource level. For instance, the CASB 100 may receive events that occur related to specific compute objects 130 within the infrastructure. The CASB 100 may also receive events that occur in relation to specific network objects 132 within the infrastructure. Additionally, the CASB 100 may receive events related to specific storage objects 134 within the architecture. This architecture allows the CASB 100 to monitor events that occur as resources are provisioned, initialized, used, or otherwise interacted with by a specific user. It additionally allows the CASB 100 to monitor events based on users, resources, applications, objects, and/or any other entities in the infrastructure. Therefore, events that are monitored on a per-user basis are used merely by way of example in this disclosure. Any of the techniques described below for monitoring events on a per-user basis may also be monitored on a per-resource basis. For example, events may be monitored for a particular compute object. When the compute object generates an event score that indicates a malicious anomaly, the compute resource may be shut down or other remedial action may be taken to minimize a perceived threat against the resource. Table 1 illustrated below lists some of the cloud infrastructure controls that may be monitored by the CASB 100.

TABLE 1

| Activity | Control |
| --- | --- |
| Compute Images - Import or Update Image | Tier 1, should be enabled as is - Alerts when compute images are imported or updated. Changing the compute images is normally performed during an update or upgrade to the image, e.g., patches to the OS. However, malicious users can change an image that would affect every compute instance launched from the image, compromising the integrity of the instance. |
| Database Systems - Update or Terminate Database System | Tier 1, should be enabled as is - Alerts when database systems are terminated or updated. Altering database systems may indicate a ransomeware attack. It may also affect the integrity and availability of the data and may release sensitive data. |
| Identity Group - Add User | Tier 1, should be enabled as is - Alerts when users are added to groups. Sensitive groups, such as the admin group, should be named in the Resource Name in order to alert when users are added to it. This policy has been configured with the resource name of CASB_SERVICE_ACCOUNT_GROUP which allows all users to read all information in the tenant. If you registered the cloud to CASB with a different group name, ensure consistency by changing the resource name in this policy. |
| Identity Policies - Create Delete or Update Policy | Tier 1, should be enabled as is - Alerts when policies are created, deleted. or updated. Changing policies will impact the all users in the group and may enable entitlements to users who do not need them. |
| Networking Virtual Cloud Networks - Create or Update VCN | Tier 1, should be enabled as is - Alerts when Virtual Cloud Networks are created. Creating or updating a VCN can allow external connections to corporate resources and data. |
| Object Storage - Create Pre-authenticated Request | Tier 1, should be enabled as is - Alerts when a pre-authenticated request is created for access to object storage. Pre-authenticated requests provide a way to let users access a bucket or an object without having their own credentials, as long as the request creator has permissions to access those objects. Access to object storage without requiring authentication impacts data confidentiality. |
| Storage Block Volumes - Block Volume Changes | Tier 2, may require modification for production services - Alerts when storage block volumes are created, attached, detached or deleted. |
| Compute Images - Export Image | Tier 2, may require modification for production services - Alerts with compute images are exported. |
| Compute Instance - Launch Instance | Tier 2, may require modification for production services - Alerts when compute instances are launched. ENSURE that contextual configurations are used BEFORE enabling this alert. As a safeguard to accidentally enabling this policy, the USERNAME context filter is set to \@company.com\"to prevent uncontrolled alerting - this configuration may be modified to trigger this alert." |
| Compute Instance - Terminate Instance | Tier 2, may require modification for production services - Alerts when compute instances are terminated. ENSURE that contextual configurations are used BEFORE enabling this alert. As a safeguard to accidentally enabling this policy, the USERNAME context filter is set to \@company.com\"to prevent uncontrolled alerting - you will need to modify this configuration in order to trigger this alert." |
| Compute Instance - Update Instance | Tier 2, may require modification for production services - Alerts when compute instances are updated. |
| Database Systems - Launch Database System | Tier 2, may require modification for production services - Alerts when Database systems are launched. |
| Identity Group - Remove User | Tier 2, may require modification for production services - Alerts when users are removed from groups. |
| Identity Groups - Create or Delete Group | Tier 2, may require modification for production services - Alerts when identity groups are created or deleted. |
| Identity Users - Create or Delete Credentials | Tier 2, may require modification for production services - Alerts when customer secretKeys, passwords or swift passwords are created, deleted, updated or reset passwords only). |
| Identity Users - Create or Update User | Tier 2, may require modification for production services - Alerts when users are created or updated. ENSURE that contextual configurations are used BEFORE enabling this alert. As a safeguard to accidentally enabling this policy, the USERNAME context filter is set to \@company.com\"to prevent uncontrolled alerting - you will need to modify this configuration in order to trigger this alert." |
| Identity Users - List credentials | Tier 2, may require modification for production services - Alerts when customer API keys, customer secretKeys or swift passwords are listed. |

TABLE 1-continued

| Activity | Control |
| --- | --- |
| Identity Users - Login Fail or Success | Tier 2, may require modification for production services - Alerts when users login successfully or fail login. ENSURE that contextual configurations are used BEFORE enabling this alert. As a safeguard to accidentally enabling this policy, the RESOURCE NAME is set to CASB_SERVICE_ACCOUNT or ADMIN to prevent uncontrolled alerting - you will need to modify this configuration in order to trigger this alert. |
| Identity Users - Upload or Delete API Key | Tier 2, may require modification for production services - Alerts when API keys are uploaded or deleted. |
| Networking Load Balancers - Create Update or Delete Listener | Tier 2, may require modification for production services - Alerts when listeners are created or deleted. A listener is a logical entity that checks for incoming traffic on the load balancer's IP address. |
| Networking Load Balancers - Create Update or Delete Load Balancer | Tier 2, may require modification for production services - Alerts when load balancers are created or deleted. |
| Networking Virtual Cloud Networks - Delete VCN | Tier 2, may require modification for production services - Alerts when Virtual Cloud Networks are created. VCNs can allow external connections to corporate resources and data. Deleting them disable functions or contribute to complete loss of service. |
| Object Storage - Create or Update Bucket | Tier 2, may require modification for production services - Alerts when a storage bucket is created or updated. |

In some embodiments, the architecture in FIG. 1B may also cover the resource-configuration level of events. For example, a bucket instance may be created in which certain objects or resources may be stored in the architecture. When an action is taken relative to that object or resource in the bucket (e.g., initialization, use, deletion, etc.) an event may be generated that can be compared to a known baseline for that event as described in greater detail below (e.g., industry baseline, per-user baseline, per-tenant baseline, etc.). This also allows the CASB 100 to monitor the state of individual resources. For example, if a bucket object is created and remains in a particular state for predetermined time window (e.g., 90 days), the state itself may be monitored and compared to predetermined baselines. Additionally, state changes may be monitored and compared to baselines and thresholds as described below.

Figure 2:
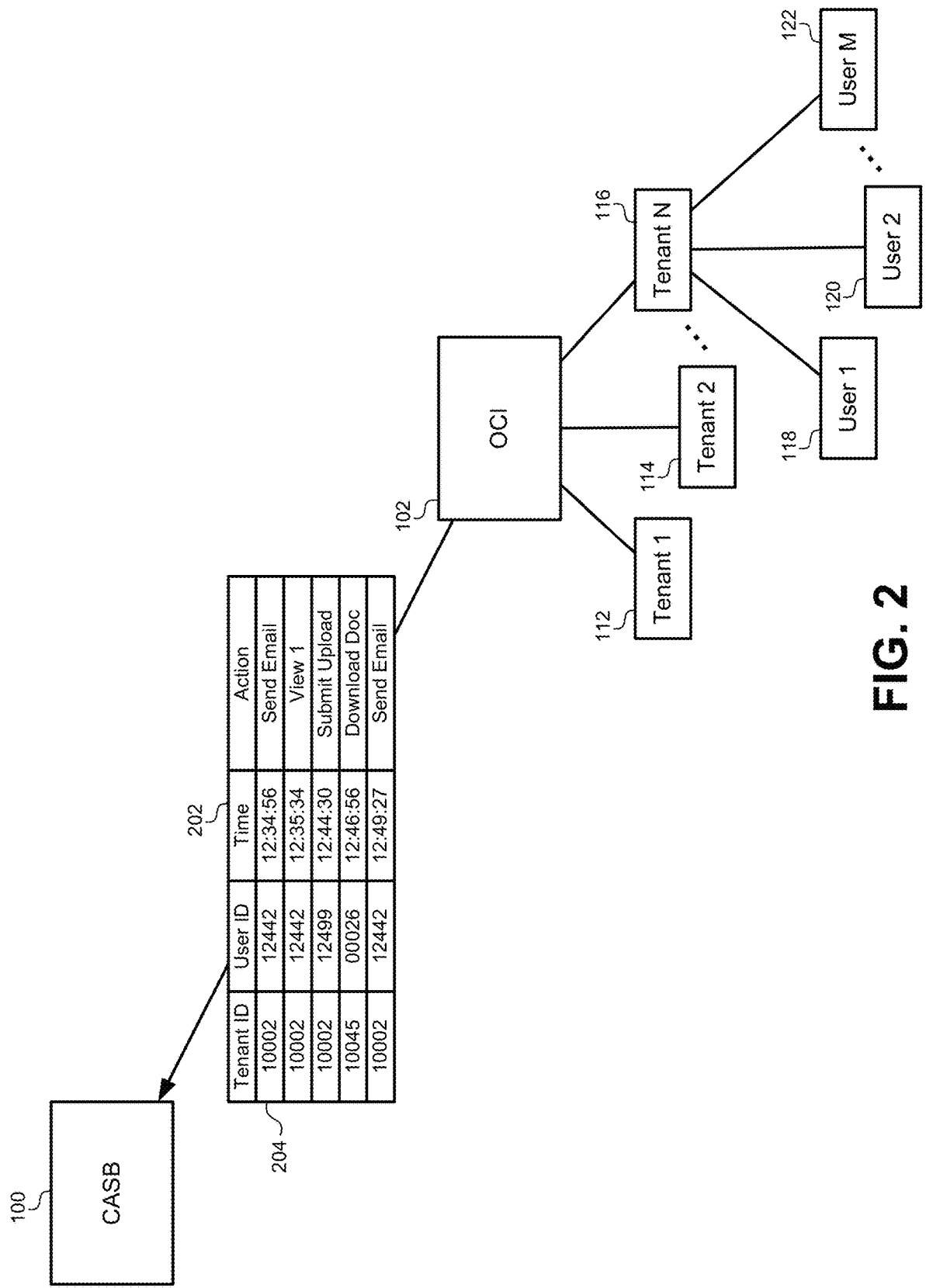
FIG. 2 illustrates a diagram depicting how data is passed from a particular cloud environment to the CASB, according to some embodiments.

FIG. 1C illustrates some of the different configuration controls 160 that may be monitored by the CASB 100, according to some embodiments. Configuration controls 160 monitor configurations and states or specific resources that may generate events when the control conditions illustrated in FIG. 1C are met. For example, an alert may be generated when a load balancer SSL certificate expires within the next 45 days. In another example, an alert may be generated when KMS keys have not been rotated within a predetermined expiration interval. In another example, an alert may be generated when a group of administrators has more members than a predetermined threshold. Each of these configurations illustrated in FIG. 1C may be monitored and used to generate alerts as illustrated. [0037] FIG. 2 illustrates a diagram depicting how data is passed from a particular cloud environment to the CASB, according to some embodiments. In this example, a particular environment, such as the OCI environment 102, may periodically pass an activity table 202 to the CASB 100 for analysis. The OCI environment 102 may be one of many cloud environments that is monitored simultaneously by the CASB 100 as illustrated in FIG. 1A. Alternatively or additionally, the OCI environment 102 may be part of the same IaaS architecture as the CASB 100 as illustrated in FIG. 1B. The activity table 202 may include a plurality of activity vectors or data rows that describe actions taken by particular users. Each row or vector may include a tenant ID, a user ID, a time, and/or an action taken, along with other data related to a particular action. For example, the activity table 202 includes a first row 204 for a "Send Email" action. This action took place at 12:34:56 PM and was executed by user #12442 in the cloud environment of tenant #10002. Each row in the activity table 202 may represent a single action, therefore the activity table 202 may include many thousands of entries over a time window to describe all of the actions for each user.

The data table 202 may be sent periodically from the environment to the CASB 100 at different intervals. For example, some embodiments may store a list of actions at the environment 102 for a predetermined time interval, such as one hour. At the expiration of the predetermined time interval, the list of actions may be transmitted together as the activity table 202 to the CASB 100, such that the CASB 100 receives a new batch of actions to analyze every hour. Some embodiments may stream rows in the activity table 202 continuously over time. In these embodiments, the CASB 100 may receive rows in the activity table 202 continuously in real time as they are generated at the environment 102. Software applications such as Cassandra® or Kafka® may be used to stream these data to the CASB 100. Some embodiments may periodically transmit batches of rows to the CASB 100 during normal operating conditions, and dynamically adjust the frequency with which transmissions are made based on analysis results of the data at the CASB 100. For example, the activity table 202 may be transmitted once per hour until a serious behavioral anomaly has been detected for one of the users. After detecting the anomaly, the time interval between transmissions of the activity table 202 may be shortened by, for example, 50% to transmit every half hour. In another example, a default time interval of one hour may be lengthened after a predetermined time interval during which no anomalies were detected. Some embodiments may transmit rows in the activity table 202 when a predetermined number of rows have been accumulated at the environment 102. For example, data rows may be stored at the environment 102 until 100 such rows have been accumulated. At this point, the 100 rows can be transmitted in the activity table 202 to the CASB 100.

It should be noted that the data in the activity table 202 need not be labeled. In other words, no single row needs to be labeled as being "normal" or "abnormal." Instead, the CASB 100 only receives an indication that an action was taken without any characterization of whether that action should be allowed or not. Furthermore, the CASB 100 need not receive any information from any of the cloud environments in the form of criteria or guidance as to which action types should be allowed, what privilege levels are operative in those environments, or how anomalies should be detected. The cloud environment simply transmits a list of actions to the CASB 100, and then relies on the CASB 100 to identify anomalies without any additional information. This process is complicated by the large number of tenants and users that may be monitored across the world.

The embodiments described herein overcome these challenges by detecting behavioral anomalies of all cloud users and formulating user peer groups to classify behaviors as abnormal. This new method may combine cosine similarity scores of cloud users' behaviors with an internally generated scoring system for certain activities. These methods may be described as unsupervised machine-learning methods, as no labeled inputs or training data sets need be required. This may be described as a machine learning algorithm that uses the cosine similarity score as an input to a model representing different baselines and thresholds to generate an "abnormal" and/or a "normal" output for each user, event, vector of events, and so forth.

Peer group analysis includes the process of categorizing a user by his or her personal and/or digital traits. In this cloud security environment, this includes active directory attributes (i.e. title, job function, business unit, manager, etc. . . . ), types of permissions allocated to a user in a given cloud application/service, his or her geographical locale(s), his or her relationship to the company (contractor, employee, etc. . . . ), a human vs. bot relationship, and so forth. The typical relation between a user and a peer group is 1:N (i.e. a single person can be associated with an undetermined amount of peer groups). Different peer groups may be assigned for generating thresholds and baselines as described below. Any and all of these peer groups described above may be used in calculating such baselines and thresholds.

The process of privilege escalation can be defined as a user who is legitimately appropriated a limited set of permissions, and in some form is granted and leverages an escalation in privileges for malicious purposes. Internal and external bad actors may use privilege escalation via insecure APIs, system/application vulnerabilities, weak identity, credential access management, and/or malicious insiders to complete some pre-planned objective. Internal bad actors may use privilege escalation using normal credentials, but performing actions that exceed the permissions allowed by those credentials.

The peer group analysis is the process performed by some embodiments of using a historic data set to make intelligent assumptions about a particular user. For example, the system may determine the a priori actions of a particular user as a means for categorizing a user as an administrative or non-administrative user. A score table may be created after the respective resource action pairs are ranked by relative privilege and stored as a labeled dataset for machine learning and data science models related to privilege escalation as described below. Actions can be effectively ranked by using a cloud application and/or service default IAM standards/policy as a means to categorize a privilege level required to complete a specific cloud event. For example, in OCI there is the standard that creating and/or editing policies may require administrative permissions because they dynamically assign management permissions to both individuals and/or groups. In another example, out-of-the-box permissions may provide some actions exclusively to a unique tenant root administrator in AWS.

The CASB 100 may receive lists of actions executed by particular users as described above. The CASB 100 may then store and analyze each of these actions on a per-user basis. FIG. 3A illustrates actions taken by a particular user as stored and analyzed over time by the CASB 100. For example, the actions illustrated in FIG. 3 may be associated with user #12442 from FIG. 2. A first time interval may be used for generating a set of histograms 300 of actions that are taken during the first time interval. For example, the first time interval may be a single day, such that all instances of each action are aggregated together for each day. The bins in the histograms 300 may represent separate activities. Thus, when a new activity record is received, the memory bin for that activity may be incremented. When a new day begins, a new array of memory locations for the new day's histogram may be allocated or reset, with each memory location representing a bin for a specific user action. When actions are received during the new day, the new memory locations may be incremented and the previous memory locations may remain unchanged as a historical record of the previous day's actions.

In FIG. 3A, each vertical column represents a histogram of user actions taken on a particular day. Each of the horizontal rows represents bin in the histogram 300 for each day. For example, on Day 1, user #12442 may have sent 22 emails, while on Day 2, user #12442 may have sent 25 emails. Note that because these values are stored in bins of the histograms 300, the particular times at which these emails were sent need not be stored. Instead, only the action bin for that day needs to be incremented to show that the action took place. In other embodiments, different time intervals may be used, such as every 1 hour, 2 hours, 6 hours, 12 hours, and so forth. Additionally, some embodiments may use different histograms for daytime hours versus nighttime hours, as well as weekdays versus weekends.

Histograms 300 may include histograms for a number of different time intervals. For example, some histograms 300 may include histograms for 90 days, 120 days, 30 days, 45 days, and so forth. Some embodiments may use an analysis window 306 that selects a number of previous days' histograms for comparison to the histogram for a current day 308. Some embodiments need not store histograms for every time interval in the analysis window 306. Instead, these embodiments may combine the histograms for the time intervals in the analysis window 306 into a single histogram that is representative of all of the time intervals. For example, some embodiments may average the values in each bin of the histograms for the time intervals in the analysis window 306 for comparison to the current date 308.

For example, the analysis window 306 may include a sliding window of 90 days used for comparison with the current day 308. The actions taken over the 90 days in the analysis window 306 may be averaged together to generate a single average histogram that is representative of the previous 90 days. On the next day, the average value can be recalculated by subtracting out the action counts of the oldest day in the analysis window 306 and adding the actions of the current date 308. The length of the analysis window 306 may include any number of days, such as: 14 days, 21 days, 30 days, 45 days, 60 days, 75 days, 90 days, 120 days, six months, one year, and so forth. The lengthy analysis window may also include ranges of days, such as at least 14 days, at least 30 days, at least 45 days, at least 60 days, at least 75 days, at least 90 days, between 14 days and 30 days, between 30 days and 45 days, between 45 days and 60 days, between six months and one year, at least one year, between one year and two years, and so forth.

Figure 3B:
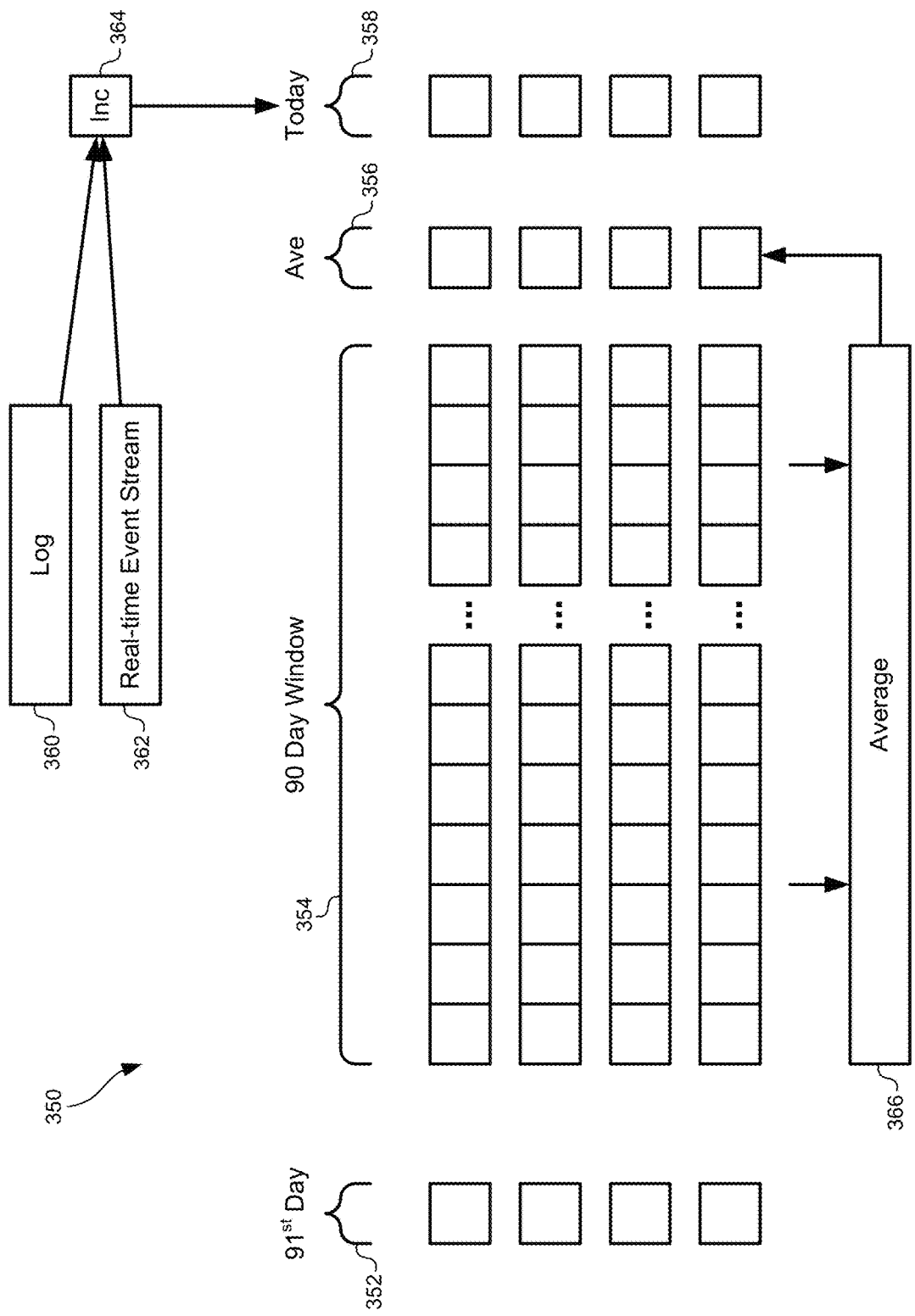
FIG. 3B illustrates an example of a histogram memory that may be incremented by events, according to some embodiments.

FIG. 3B illustrates an example of a histogram memory that may be incremented by events, according to some embodiments. In this example, an analysis window of 90 days is used merely by way of example. The 90 day window 354 may include a memory location for each event on each time interval in the 90 day window 354. For example, each day may include a memory location corresponding to each event.

To record new events in a current day, a number of different methods may be used to receive and process incoming events. In some embodiments, the system may periodically receive a log 360 that includes a list of events that have been triggered by various users, resources, applications, and so forth. The log 360 may be parsed to identify specific users/resources associated with each event. The histogram memory for the associated user/resource may then be identified and for each event that is recorded in the log 360, and an event counter stored in the memory location for that event on that day may be incremented. A simple increment function 364 may be used to increment the value of the memory location with each event processed.

In some embodiments, the system may receive a real-time event stream 362 that is received as the events are generated by the system. This may be used particularly in the IaaS architecture of FIG. 1B described above. Memory locations may subscribe to particular event streams for resources, users, and/or event types. When new events are received, they can be channeled to the specific memory location to increment an existing value. The value incremented may be a set of registers representing a current date 358.

The 90 day window 354 may be processed at the end of each interval (e.g., at the end of each day) to calculate an average for the current 90 day window 354. An averaging function 366 may aggregate the event totals for each of the days in the histogram memory for each event type. The averaging function 366 may then divide this aggregate by the length of the 90 day window 354 to generate an average value 356 for each event type. The average value 356 may then be compared to the event count for the current day 358 to generate real-time alerts as the events are processed. As described above, some embodiments may subtract a last day 352 shifted out of the window (e.g., the $91^{st}$ day) and add the most recent day to a current average value 356. This may minimize the mathematical operations performed by the system when aggregating a large number of days in the 90 day window 354.

Upon moving to a subsequent time interval, such as moving to the next calendar day, the system may shift the values from the current date 358 into the 90 day window 354 and reset the values for the current date 358. The system may also update the average value 356 for the previous 90 day window by subtracting the $91^{st}$ day 352 and adding the current date 358 divided by the length of the 90 day window 354.

Figure 4:
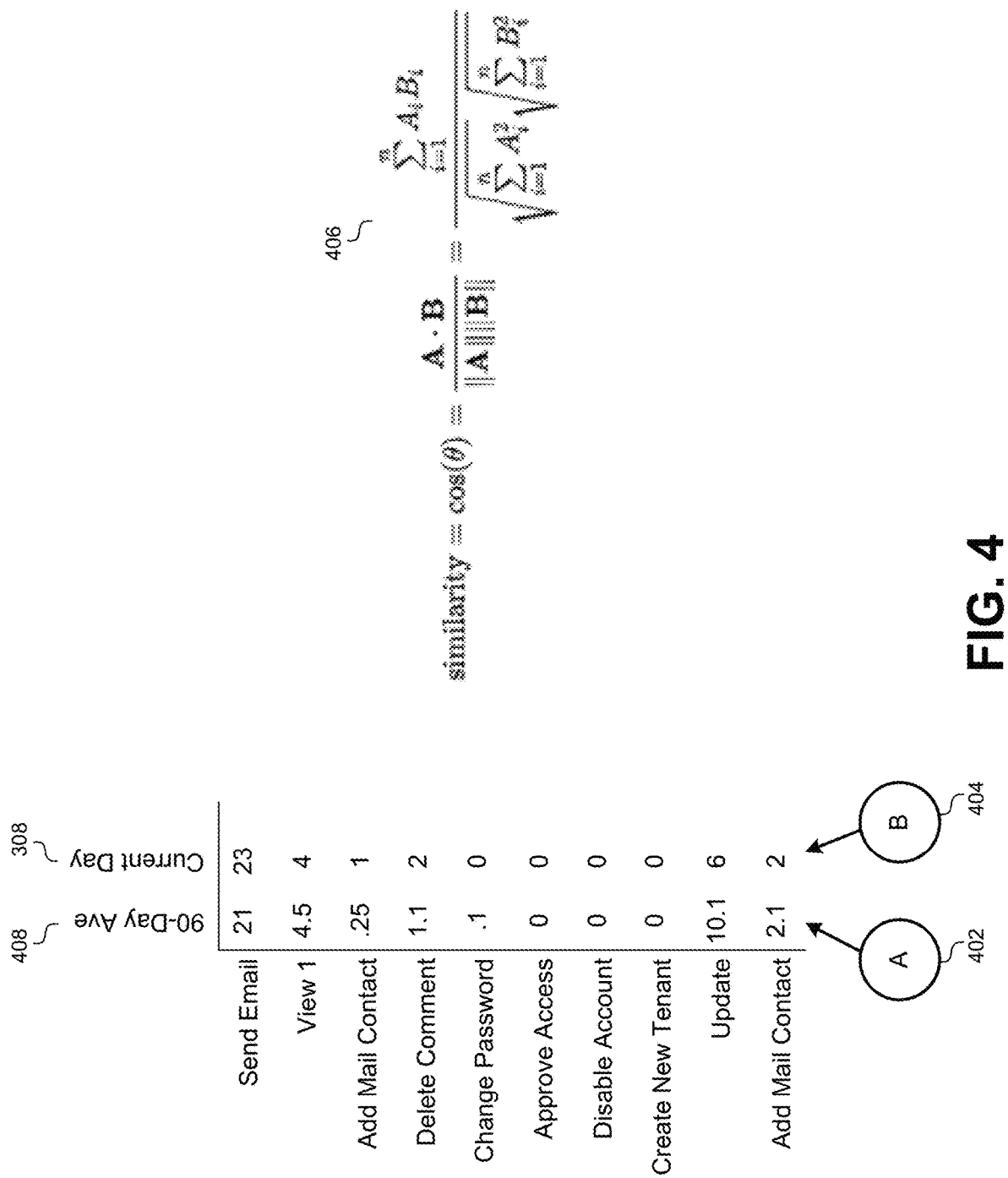
FIG. 4 illustrates the average of the activity window in comparison to the current day, according to some embodiments.

FIG. 4 illustrates the average of the activity window 408 in comparison to the current day 308, according to some embodiments. As described above, average of the activity window 408 may be calculated by aggregating the values in each of the time bins for each of the daily histograms for each action type. This value may then be divided by the length of the analysis window 306 to generate the average values illustrated in FIG. 4. Anomalies can then be detected in part by comparing the average of the activity window 408 with the action counts of the current date 308. As used herein, the terms "action" and "event" may be used interchangeably. Actions may refer to specific actions taken by users or against a particular resource, while events may represent generated indications of those actions. However, this disclosure and the claims may use these two terms interchangeably.

Various statistical methods can be executed to compare the average of the activity window 408 to the actions of the current date 308. Some embodiments may calculate the Euclidean distance between each entry. Other embodiments may calculate the Hamming distance. The embodiment of FIG. 4 treats the histograms for the average of the activity window 408 and the current day 308 as data vectors. This example then calculates the multidimensional cosine value between the two vectors 402, 404 as an estimate of their similarity. This calculation may include calculating the dot product of the two vectors and dividing the result by the product of the magnitude of the two vectors. A first vector may be representative of actions taken during a plurality of previous time intervals, such as the average of the analysis window described above. A second vector may include counts of actions taken by a particular user, on a particular resource, using a particular application, and so forth, during a current time interval, such as during a current day. A sample equation 406 is illustrated in FIG. 4. Pseudocode for calculating the similarity of the two vectors is illustrated below.

```
from sklearn.metrics.pairwise import cosine_similarity
dfC=dfM.groupby(['evntactor', 'evntaction']).apply
(lambda g:
cosine_similarity(g['count_x'], g['count_y']))
df=pd.DataFrame(cosine_similarity(v3[:, 1:], v4[:, 1:]))
def cos_sim(a, b):
    dot_product=np.dot(a, b)
    norm_a=np.linalg.norm(a)
    norm_b=np.linalg.norm(b)
    return dot_product/(norm_a*norm_b)
import numpy as np
    def cosine(a, b):
    return np.dot(a, b.T)/(norm2(a)*norm2(b))
```

Calculating a measure of similarity between the two vectors 402, 404 can be used to characterize anomalies in the behavior of the user on a day-to-day basis. Stated another way, if the activities taken by user on the current day are significantly different than the average activities taken on a previous day, then this may represent anomalous behavior. This characterization may be made without knowing whether the individual actions are allowed to be executed by the user or not. Users are typically granted a set of permissions or privileges referred to herein as a "privilege level." A user's privilege level will allow them to take certain actions without consequence. However, "privilege escalation" occurs when a user takes an action that is above that which is allowed by their privilege level. However, the CASB 100 does not know the privilege level of each user, and does not know which actions are associated with each privilege level. Therefore, the CASB 100 uses this comparison of current user actions with previous user actions to identify actions that may indicate the user is doing something outside of their permission level. This operates on the assumption that users do not operate outside of their privilege level excessively over time without being caught by the particular cloud environment for the customer. The CASB 100 can identify and flag such behavior before it becomes a pattern or excessive enough to trigger most internal customer cloud controls. The result may be characterized as a similarity between the first vector and the second vector.

Figure 5A:
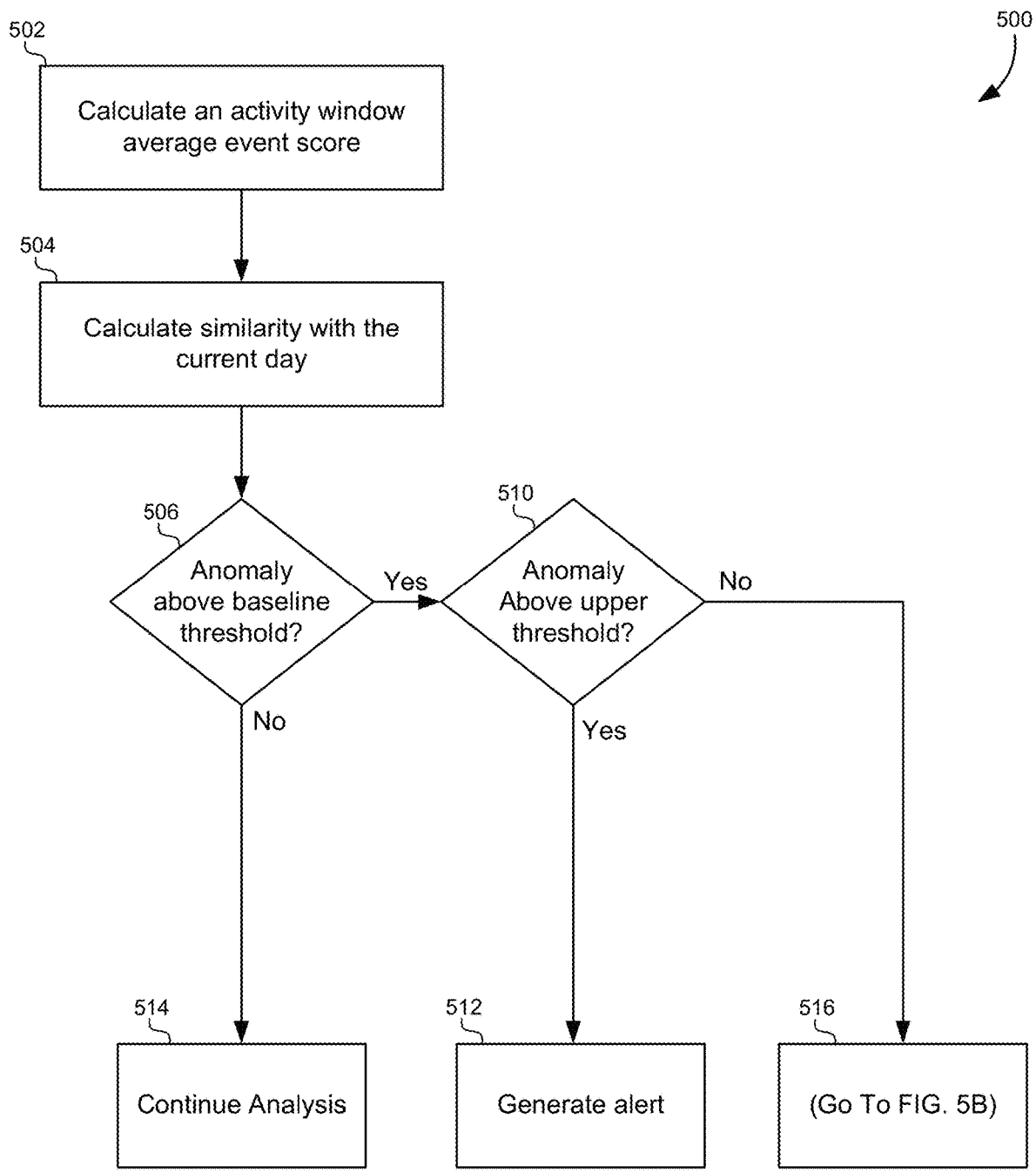
FIG. 5A illustrates a flowchart for a method of detecting anomalous user behavior in a cloud environment, according to some embodiments.

FIG. 5A illustrates a flowchart 500 for a method of detecting anomalous user behavior in a cloud environment, according to some embodiments. At step 502, an average action histogram may be calculated for an activity window, such as an average event score for each type of action occurring in previous analysis window. This may be calculated by receiving and processing events that are specific to users, resources, applications, and/or other objects/entities in one or more cloud environments. The system may monitor many cloud environments simultaneously as depicted above in FIG. 1A, or may be part of an IaaS cloud infrastructure as depicted above in FIG. 1B. The average event score may be calculated by aggregating the event scores from each individual time interval within the analysis window and dividing it by the length of the window. In other embodiments, different statistical methods may be used to generate an event score in addition to an average score. For example, some embodiments may use a median value or a mode value. Some embodiments may remove various outliers that go beyond a threshold of the average when calculating the event score. In some embodiments, event scores from some days in the analysis window may be more heavily weighted than those of other days (e.g., events occurring on a weekend may be more likely to be suspicious than events occurring on a workday). In some embodiments, this event score for the analysis window may be generated at the end of each interval in the analysis window (e.g. at the end of each day) such that it can be compared continuously to events as they occur on the next day. The analysis window may be a sliding window where values in the histogram drop off a rear edge of the window as new values are added to an opposite end of the window as depicted in FIG. 3B above.

At step 504, the similarity between the average event score for the activity window and the event score of the current day can be calculated. This similarity may include the cosine similarity function described above. However, the cosine similarity is used only as an example and is not meant to be limiting. Other embodiments may use other similarity measures or similarity functions to calculate the similarity between the average event score and a current event score. Some embodiments may use a Euclidean distance or a Manhattan distance. Some embodiments may use a Minkowski distance. Some embodiments may use a Jaccard similarity. In short any similarity measurement may be used when comparing these two values.

At step 506, the similarity score can be compared to a baseline threshold to classify the user behavior as anomalous. The baseline threshold may represent a minimum threshold for evaluating the event score for a current day. For example, crossing the baseline threshold may represent an initial indication that an anomaly has taken place for this type of event for this user/resource/application, etc. This baseline threshold may be calculated using a number of different methods. In some embodiments, the baseline threshold may be calculated as a predetermined statistical difference from the event score for the activity window. For example, a baseline threshold may be a number of statistical deviations away from the average value of the activity window based on the average value calculation. In some embodiments, the baseline threshold may be calculated using average values that are aggregated across a user, across a particular tenant, across users in an industry, across users monitored in multiple cloud environments by the system, and/or any other peer group described above for peer-group analysis.

In some embodiments, the baseline threshold may be dynamically calculated and adjusted using a machine learning algorithm. For example, the machine learning algorithm may include a neural network that receives the event scores for the event scores for the current day and for the activity window. The neural network may also receive the similarity score calculated between these two event scores. The neural network may then output an indication of "normal" or "abnormal." The baseline threshold represented by the neural network may be adjusted over time as data is continuously provided to the network and used to train the network. For example, when an alert is generated, a response to that alert may be used as a training input to determine whether the corresponding output of the neural network was correct (e.g., did the alert generate a responsive action or was it suppressed?).

Some embodiments may stop the analysis here and simply report the anomalous behavior to the customers cloud environment. However, some embodiments may perform further analysis steps to better classify the anomalous behavior as acceptable anomalous behavior or unacceptable anomalous behavior. Specifically, some anomalous behavior may not be of concern, and instead may simply be behavior that is not often executed by most users. For example, a first privilege level, such as a user privilege level, may allow users to set an acceptable domain. This action may be allowed at the user privilege level, but may only be executed rarely, such as once a month. Therefore, every execution of this action may appear to be anomalous, while still being entirely acceptable to the customer cloud environment.

The method may also include determining whether the anomaly exceeds an upper threshold (510). The upper threshold may be calculated in a manner similar to how the baseline threshold was calculated as described above. The upper threshold may characterize an event score as definitely unauthorized. These two thresholds together allow for a robust characterization of event scores. As an event score climbs above the baseline threshold, the event goes from being characterized as benign to being at least suspicious. As that event score continues to climb towards the upper threshold, suspicion may increase regarding that event score. When that event score finally crosses the upper threshold, an alert may be generated (512) to indicate that the event score represents a known anomaly related to that user, resource, application, and/or other object.

Figure 5B:
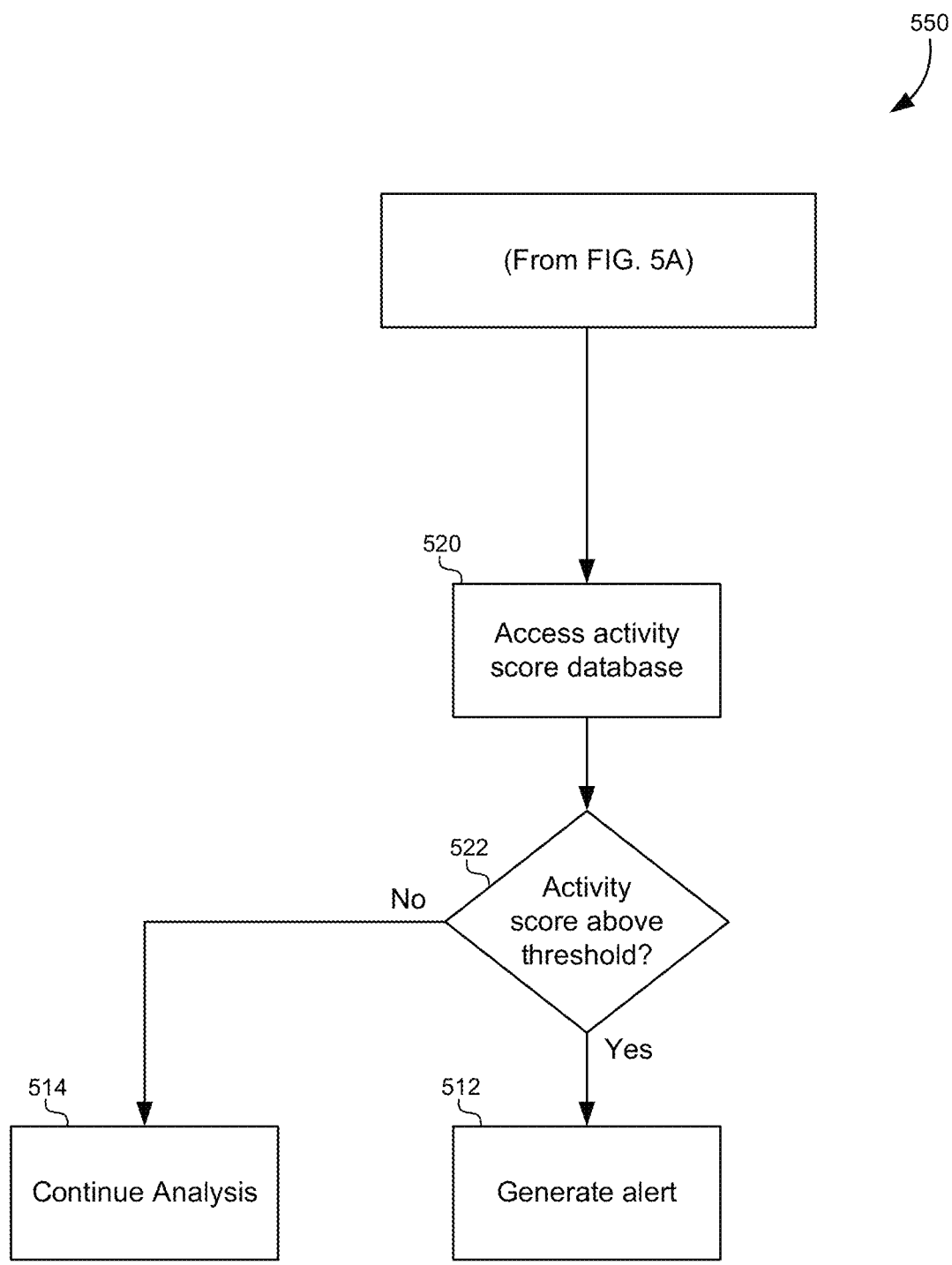
FIG. 5B illustrates a flowchart for generating suspicious event scores, according to some embodiments.

For event scores that fall between the baseline threshold on the upper threshold, additional processing may be performed to determine whether a suspicious event score should generate an alert. FIG. 5B illustrates a flowchart 550 for generating suspicious event scores, according to some embodiments. Flowchart 550 may be a continuation of flowchart 500 described above. To further refine the process, some embodiments may generate and/or access an internal score table that provides a numerical score for each action in the action histograms. For example, the scores may range between 1 and 100. The higher the score, the higher the assumed privilege level may need to be for the action to be allowed. For example, sending an email may have a score of 2, while instantiating a new company entity may have a score of 95. In general terms, the score for anomalous actions may be used to classify the anomalous action as normal or abnormal.

Continuing with flowchart 500, at step 520, a score database may be accessed. The score database may include a list of activity scores that indicate a perceived severity of the action relative to other actions. Using the similarity measurement described above only compares the frequency with which events occur with a baseline frequency based on historical usage to train the model. However, this score is more subjective and may be related specifically to the type of event rather than just the frequency of its occurrence. Events that require higher levels of authorization or that have more severe consequences for misuse may be generally score higher. These events are less likely to be performed by regular users.

The activity score database may be based at least in part on administrator input that characterizes certain events. For example, events related to starting a new virtual cloud network (VCN) may have a higher score based on an administrator's knowledge that such an event should be rarely used and only performed by authorized users. In some embodiments, the activity score database may also be generated and refined automatically using a machine learning algorithm. Based on feedback received after generating alerts, the activity score database may be adjusted to be more likely to correctly characterize event scores. For example, if a false alert is generated based on an event score, the corresponding activity score in the activity score database may be increased, while anomalies that go undetected may result in an event score being decreased. A neural network may be used to represent the value of the activity score where the output of the neural network is refined over time to adjust dynamically to current characterizations of that activity.

The score database may be stored as a score table. The scores may be generated internally by a machine learning algorithm that scores activities based on their relative frequency across a number of users. Some embodiments may also receive scores as assigned by an administrator. In some embodiments, scores may range from a value of 0 representing the baseline score for the baseline threshold described above and a value of 100 representing the upper threshold also described above. Thus, the activity score in the activity score database further characterizes an event score as being an actionable anomaly between these two thresholds. An example of a score database or score table is illustrated below in Table 1. Note that this is a small subset of the possible actions that may be in a score table. In practice, the score table may include may more actions with associated scores.

TABLE 1

| Action | Score |
|---|---|
| DlpRuleMatch | 80 |
| FileMalwareDetected | 99 |
| Update application. | 60 |
| Update | 17 |
| New-MailContact | 20 |
| New-TransportRule | 60 |
| Remove app role assignment from user. | 15 |
| SiteDeleted | 70 |
| AccessRequestApproved | 65 |
| Change user password. | 60 |
| Disable account. | 65 |
| New-AdminAuditLogSearch | 60 |
| RemovedFromSecureLink | 55 |
| Set-AcceptedDomain | 12 |
| CommentDeleted | 10 |

If the score of the particular anomalous action is above a predetermined threshold at step 510 that is determined by the activity score database, an alert can be generated at step 512. The predetermined threshold may be generated in a number of different ways. In some embodiments, the threshold may be statically set. For example, any anomalous action with the score over 75 may be flagged to generate an alert. In some embodiments, a score of the action may be compared to scores of other actions performed in the past. For example, if the anomalous action had a score of 90, but the user periodically performs actions in the past with similar high scores, then it may be assumed that the user has a higher privilege level that allows those high-score actions to be executed. Therefore, even if performed rarely, these high-score actions need not generate an alert because they have been previously performed for that user on a regular, even if infrequent basis.

At step 512, an alert may be generated that describes the action taken as an anomaly and may provide additional information to the customer cloud environment. For example, the method may be executed using Python and various code libraries running on a Linux node using Ubuntu 16 or higher in the cloud. These code files may be triggered by a shell script to read in a dictionary file of user actions and daily input files received from the various customer cloud environments. These daily input sets may be analyzed as described above to generate anomaly alerts and explanation files in, for example, a CSV format. Additionally, a user interface may display the alerts and/or explanations for the cloud environment administrators. If no alerts are generated, then the analysis can continue for the next time interval at step 514.

It should be appreciated that the specific steps illustrated in FIGS. 5A and 5B provide particular methods of detecting anomalous user behavior in a cloud environment according to various embodiments of the present invention. Other sequences of steps may also be performed according to alternative embodiments. For example, alternative embodiments of the present invention may perform the steps outlined above in a different order. Moreover, the individual steps illustrated in FIGS. 5A and 5B may include multiple sub-steps that may be performed in various sequences as appropriate to the individual step. Furthermore, additional steps may be added or removed depending on the particular applications. One of ordinary skill in the art would recognize many variations, modifications, and alternatives.

Entropy-Based Classification

In addition to the methods described above for detecting anomalous behavior, some CASB 100 systems may also benefit from methods that distinguish between human users and machine users. Specifically, some embodiments described below may be used to distinguish between a human user and a bot, or other automated software program providing impersonated human inputs. A new method is used to compute entropy values of the collected event action data. This method has been tested in a cloud environment and is capable of classifying actions that originate from human users as opposed to digital entities or artifacts across all cloud tenants in various cloud applications or providers. The digital entities or artifacts may include bots, automated applications, scripts, software agents, services, and so forth. The input data maybe one or more input data fields from the human users and/or digital entities. However, none of the input data needs to meet the requirements of a training data set or be labeled in any way.

It may be of particular interest to distinguish between human users and bots in the cloud environment because most malicious attacks on a cloud environment may involve bots. While some isolated data breaches occur as the result of an individual user, the majority of attacks on cloud environment services are perpetuated by large-scale attacks using automated software programs to execute requests against the cloud environment to deny service to other users. A denial of service attack (DoS) occurs when bots are able to flood the cloud service with enough requests to deny access to the service to legitimate users. A distributed denial of service attack (DDoS) occurs when bots are distributed across a number of different legitimate-looking connections. Instead of being able to identify a DoS attack by recognizing a large number of requests originating from a small number of sources, a DDoS is much harder to diagnose until it has already affected the availability of the service. Each of the individual requests during a DDoS may appear to be from a legitimate source. Therefore, there is a need in the art for methods to quickly and reliably distinguish between requests from bots and requests from legitimate users.

Cloud security benefits from transparency of user actions, user identities, and user credentials. There are human users and non-human users in nearly all cloud applications such as OCI, O365, and AWS. The non-human users can include software agents, or digital entities, bots, and/or automated services. One of the CASB 100 features implemented by the embodiments described herein is also to identify or detect such bots, digital entities, and/or artifacts, in order to identify when then take actions on behalf of humans compared to when they are controlled by a botnet or other malware as cloud threats. For example, digital entities may perform legitimate actions on behalf of users that should not be flagged as suspicious or malicious. In some embodiments, financial monitoring services may periodically log into user accounts and extract summary information on behalf of users. In some embodiments, email clients may periodically retrieve data from an email server on behalf of users. In some embodiments, users may use automated services to check into flights, book travel, and/or make scheduled payments. Each of these activities may be recognized as a bot activity that is related to a legitimate user request, and thus these bot activities need not be flagged as malicious. The challenge then becomes not only distinguishing bots from humans, but distinguishing bots performing an attack from bots acting on behalf of humans.

As described above, additional key challenges include the fact that no labeled data may be provided from cloud tenants to train supervised machine-learning models and other artificial intelligence (AI) methods. Specifically, no labeled or known datasets may be available to define human and non-human actions. Other challenges include the fact that a very large number of daily actions across thousands of cloud tenants and millions of cloud users create a unique security challenge. In short, the only information that may be available to the CASB 100 is the record of events provided in a log or real-time stream as described above.

The embodiments described herein solve these problems by (1) quickly detecting or classifying human users and bots in each cloud application (e.g., OCI, O365, AWS, etc.), and (2) providing a new indicator for cloud user peer group analysis and cloud security. Human users and bots may be quickly and automatically distinguished from each other by computing entropy values of the collected event action data. The system may be implemented in a Linux system using Python code and other libraries. Pandas data frames may be computed and combined with action risk scores of cloud applications (e.g., OCI, O365, AWS, etc.) described above.

To use the invention, Python and libraries (such as Pandas, numpy, etc.) may be installed in a Linux (e.g., Ubuntu 16 or higher) node in a cloud. The new Python code may be triggered by a shell script to read in a dictionary file of the user actions and daily input files. The input datasets may include all cloud tenants, all users, and their actions in a recent activity window (e.g., the last 90 days) from cloud services or IaaS architecture as described above. The output datasets may include the anomaly alerts and explanation files in CSV format. A user interface may show the CABS customers (cloud providers, analysts, etc.) the bot-based alerts and the classification reasons.

These embodiments are based on an assumption that human users will use text strings that have a low entropy value. In other words, humans use words to describe their actions that are not random, but instead are based on words in common use in the English language. In contrast, bots or computer entities will more commonly use text string labels that are randomly generated in order to avoid string collisions. While humans are intuitively good at selecting unique text strings that will not be repeated by other random users, this is not necessarily true of most bots. Specifically, bots tend to execute a large number of requests using randomly generated text strings to avoid repeated requests and collisions with other requests from other bots in the network. This is particularly true when bots are executing a large-scale attack on a cloud entity and generating a large number of actions or data inputs. By calculating the entropy of the strings, high entropy strings can be identified as likely to be machine-generated, while low entropy strings can be identified as likely to be human-generated.

Although a number of different techniques may be used to calculate the entropy of a text string, a particular method is described below as an example. However, this particular equation and calculation is not meant to be limiting. In some embodiments, the logarithm of the probability distribution may be useful as a measure of the entropy. There are multiple math formulas to compute the data entropy values. For example, Shannon entropy is one of the most important metrics in information theory. Entropy measures the uncertainty associated with a random variable, i.e. the expected value of the information in the message.

The embodiments described herein use the term "entropy" to characterize a text string. For example, a lower-entropy text string is less likely to be randomly generated than a higher-entropy text string. Therefore, entropy may represent an average rate at which information may be produced randomly. When a text string produces a low-probability value, the texturing may be assumed to carry more information than a texturing that produces a high-probability value. This assumption is used to infer that user-generated strings carry some amount of information or "meaning" compared to random strings generated by bots solely for the sake of labeling data.

FIG. 6A illustrates an example equation 600 for calculating the entropy of a text string, according to some embodiments. English text, treated as a string of characters, generally has a fairly low entropy value because it is not likely to be generated randomly. For example, English text usually has between 0.6 and 1.3 bits of entropy per character of the message. Humans typically use such text (English, French, etc.) to name and interact with their cloud services, and thus this text includes a high amount of information relative to randomly generated text. For example, user ID texts generally have low entropy values when generated by humans because humans prefer ID, passwords, and/or other identifiers that are easy to remember. This leads humans to use common words or phrases to identify resources and formulate requests.

The equation in FIG. 6A assumes that the measure of information entropy and a text string may have a value that is proportional to the negative logarithm of a probability mass function for the value. In this equation, the value of b for the base of the logarithm may be 2, e, 10, or any other value. The expression $p(x_i)$ represents a probability mass function for each character found in the text string. For example, this probability mass function may be calculated by counting the total number of occurrences of a particular character, token, or word in the text string. This total may then be divided by the total number of characters in the text string to determine the probability at each location of that character, token, or word occurring. For example, if the letter "a" appears 5 times in a text string having a length of 25 total characters, the $p(x_i)$ value for "a" would be 5/25=0.20. The expression 602 in equation 600 can be calculated for each unique character, word, or token in the text string, and the results can be summed to generate the final entropy value for the text string.

Figure 6B:
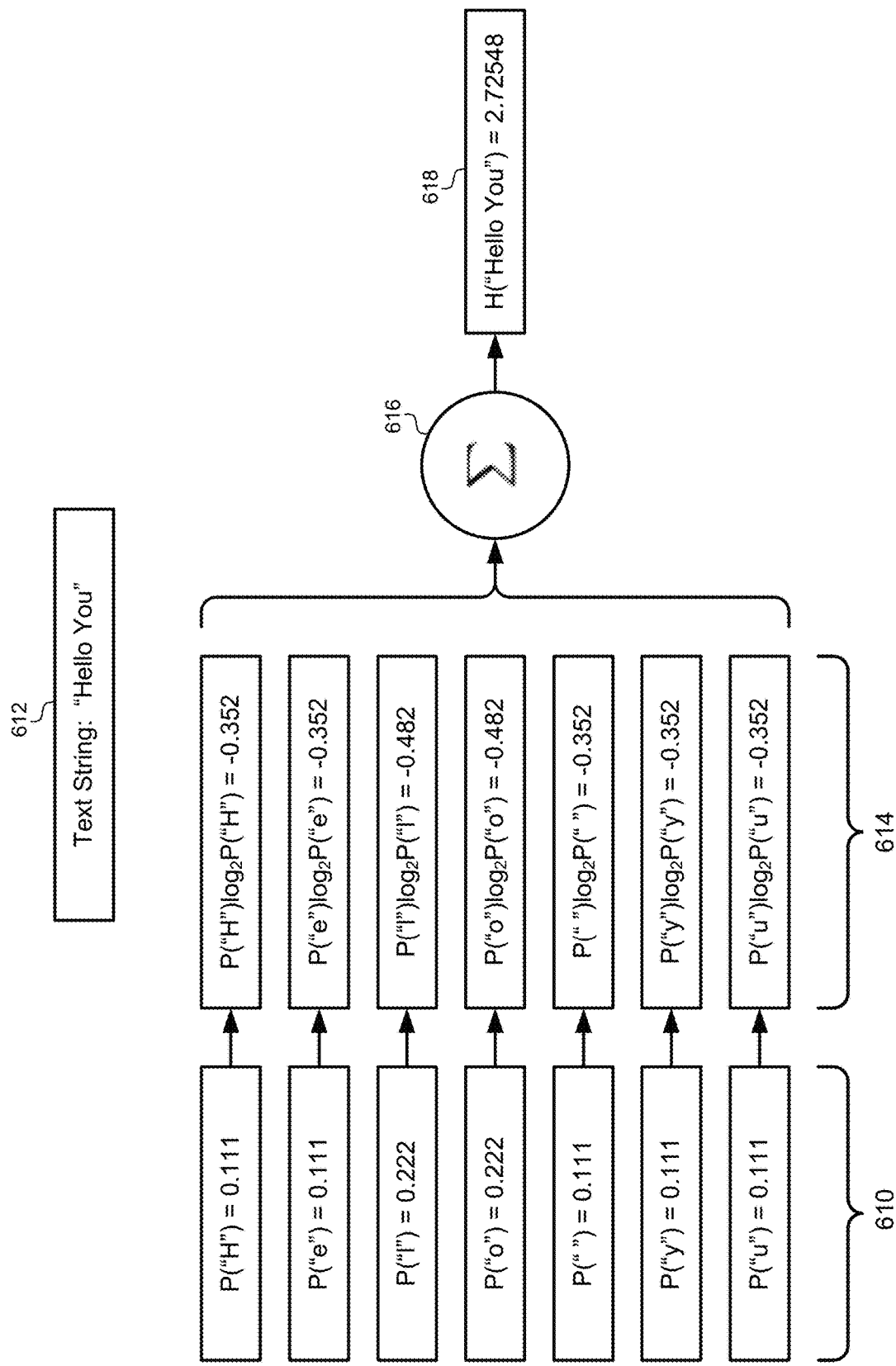
FIG. 6B illustrates an example of how to calculate the entropy of a text string, according to some embodiments.

FIG. 6B illustrates an example of how to calculate the entropy of a text string, according to some embodiments. In this simplified example, the text string "Hello You" 612 is used as an input texturing. For instance, this text string 612 may be part of a request, a username, and address, and/or any other value received as a submission to a cloud service. To calculate the entropy of the text string 612, a probability mass function may be checked related for each character in the text string 612. The probability mass function 610 may be calculated by determining a total number of unique characters, tokens, or words in the text string 612. In this example, individual characters are used as the basic unit for the entropy calculation. There are 9 total characters in the text string 612, so the total character count for each character may be divided by 9 to calculate the probability mass function for that calculator. For example, the probability mass function for the "H" character is ⅑=0.111.

After calculating the probability mass function 610 for each character in the text string 612, the entropy for each character 614 can be calculated by multiplying the probability mass function 610 with a logarithm of the probability mass function 610. In this example, the logarithm having a base 2 is used. The result of this operation for each entropy value 614 can be summed 616 to generate an overall entropy value 618 for the text string 612. In this example, the overall entropy value 618 is 2.72548

To interpret the meaning of this entropy value 618, it may be compared to entropy values calculated for other text strings received by the cloud environment. The entropy value 618 describes the minimal number of bits per symbol needed to encode the information in a binary form. When encoded in a binary form, the logarithm base 2 is used. Therefore, in this example each symbol in the text string 612 would need 2.72 bits to optimally encode this string. This value can then be compared to other values, thresholds, baselines, and/or other metrics by the cloud system to identify the text string 612 as originating from a user or from a malicious bot. In this case, the entropy for the text string is relatively low indicating that it is likely generated by a human. Note that the overall length of the text string 612 is relatively small, and thus this entropy value 618 is larger than typical entropy values that may be attributed to human users.

Where human users employ common English words and phrases in generating requests, bots (software agents, automated tiny services, etc.) register digital entities by using hashings, encodings, or other random or pseudo-random text in a cloud environment in order to avoid name conflicts, collisions, redundancy, and/or duplication. As a result, the hashed or encoded messages have much high entropy values when they are machine generated.

FIG. 7 illustrates a table of bot-generated text strings 702 and their associated entropy values 704 as calculated by equation 600, according to some embodiments. Notice that each of the text strings scores a relatively high entropy value greater than 4.5. The relatively high entropy value 704 for each of the text strings 702 becomes evident when observing that a large number of different characters are used in the text string 702 relative to the overall length of the text string 702. The higher entropy value indicates that a large amount of information is stored in a relatively short string, requiring nearly 5 unique bits for each character to properly encode the text strings 702. Also notice that some of the text strings include a mix of random character strings and English language words or tokens. The random nature of the bot-generated strings is still sufficient to elevate the entropy 704 to be significantly higher than human-generated text strings, even when a portion of the bot-generated text strings 702 include English-language words.

FIG. 8 illustrates a table of human-generated text strings 802 and their associated entropy values 804 as calculated by equation 600, according to some embodiments. Notice that each of these text strings scores a relatively low entropy value of less than 3.5. Also notice that each of these text strings 802 predominantly includes English language words or phrases. Although some of the text strings 802 include somewhat-random sequences (e.g., "abc", "o365", etc.), the predominance of low-entropy sequences dominates the calculation to pull the overall entropy 104 down below 3.5 for each text string 802.

FIG. 9 illustrates pseudocode 900 for calculating the entropy of text strings, according to some embodiments. This pseudocode represents an efficient method of incrementally calculating the entropy of a string by making a single pass through each character in the string and incrementally adding its contribution to the overall entropy of the string. First, a running count is maintained for each character in the text as it is identified in the text string by code 902. After making a pass through the text string, a frequency is calculated for each unique token, character, or word in the text using code 904 to represent the probability mass function of that token, character, or word. The overall entropy is then calculated by incrementally summing the entropy components contributed by each character using code 906.

Figure 10A:
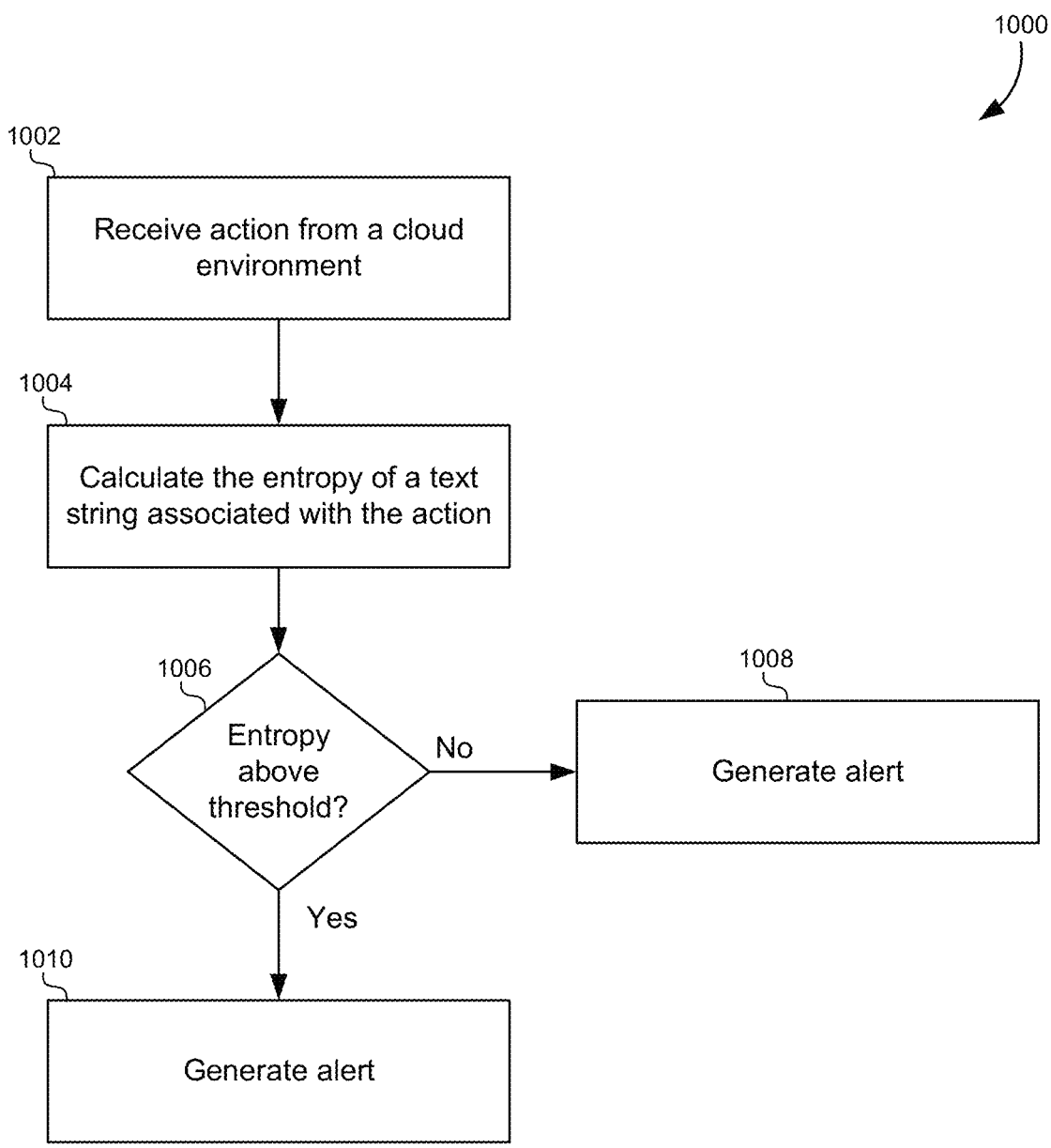
FIG. 10A illustrates a flowchart of a method for determining whether an action in a cloud environment is bot-generated, according to some embodiments.

FIG. 10A illustrates a flowchart 1000 of a method for determining whether an action in a cloud environment is bot-generated, according to some embodiments. This method may be carried out by the CASB 100 in either the multi-cloud environment or the IaaS environment described above. Additionally, this method may be executed at any stage in the monitoring process. For example, this method may be executed at any point in FIGS. 5A and 5B described above where it may be useful to distinguish a human user from a bot. Therefore, the steps of flowchart 1000 may be inserted in any location of FIGS. 5A and 5B according to various embodiments.

The method may include receiving an action from a cloud environment (1002). The action may be received as part of an action log and/or as part of the live stream of actions received from the cloud environment. In some embodiments, the action may be received after comparing actions to a threshold. For example, after determining that a vector of actions exceeds a baseline threshold, one or more of the actions may be passed to this method for further analysis. The system described above may view actions that surpass the baseline threshold as being suspicious but not yet actionable. However, determining that a suspicious action is carried out by a bot rather than a human user may raise the suspicion level sufficiently to generate an alert.

The method may also include calculating the entropy of a text string associated with the action (1004). The text string may be comprised of any part of a string that is descriptive of the action. For example, the text string may be extracted from a request, an email address, a username, a resource name, and/or any other text that may accompany or may be descriptive of the action. In some embodiments, the text string may be comprised of multiple text strings that are processed together. For example, a number of requests against the same resource and/or from the same user may be concatenated to generate a single text string. A request that randomly changes portions of the request text with each request will have a higher entropy than a request that repeats the same information in each request. If a bot is changing its request text with every request, the entropy over a single request may be low, but the entropy over multiple requests may be relatively high. This may be contrasted with human requests that often use the same information (e.g., username, email address, etc.) across multiple requests.

In some embodiments, the method may optionally add an additional step before calculating the entropy. In some cases, the text string may be parsed to remove any standard text from the text string before the entropy is calculated. For example, email addresses may include a standard suffix (e.g., "@company.com") for all email addresses sent to/from an email server. Standard text such as this that may be included in many actions in the cloud environment and may artificially lower the entropy of text strings that may otherwise belong to bots. Therefore, some embodiments may process the text string to remove standard text before calculating the entropy. For example, some embodiments may remove text that follows known delimiters, such as "@", "GET", and other indicators of standard text. Some embodiments may also use a white list to remove known text strings that are commonly in actions that may be used by both humans and bots. This white list may include command names, sub-strings such as ".com", resource names, and/or other commonly used strings. By removing this information, the entropy of the bot-generated or human-generated portion of the string may be isolated from the portions of the string that are incident to using the cloud environment.

The method may further include determining whether the string is bot-generated based at least in part on the entropy (1006). For example, the method may compare a calculated entropy to a predetermined threshold for making this determination. Thresholds may be determined in a number of different ways in different embodiments. Some embodiments may assign specific thresholds to specific actions. For example, an entropy threshold for sending email actions may be higher than an entropy threshold for storage requests. In general, thresholds may be higher for activities that are commonly performed by bots on behalf of humans, while thresholds may be lower for actions that should only be performed by humans.

In some embodiments, the entropy threshold may be dynamically adjusted over time using a neural network. For example, the threshold may be represented by a neural network, and determining whether the calculated entropy is of the threshold may include providing the text string and the activity, along with optionally other information descriptive of the action as inputs to the neural network. The neural network may then include at least two outputs indicating whether the calculated entropy is likely indicative of a bot or human executing activity.

In some embodiments, the entropy threshold may be adjusted based on various factors related to the resource, user, or other object on which the action is taken. For example, a single action taken against a resource may begin with a relatively high threshold for determining bot activity. As a rate of actions that are executed against the resource exceeds a threshold, the entropy threshold for that resource may be reduced. Because bot actions may be generated en masse as part of an attack, numerous actions may indicate that a bot attack is more likely. These types of secondary factors indicating a higher likelihood of bot actions may be used to adjust the entropy threshold accordingly. Generally, any characteristic of an action may be used to adjust the entropy threshold at runtime, including an identity of a sender, a type of action, a target of the action, a severity of the action, a baseline threshold and/or upper threshold assigned to the action as described above, a score from an action score table as described above, and so forth.

Figure 10B:
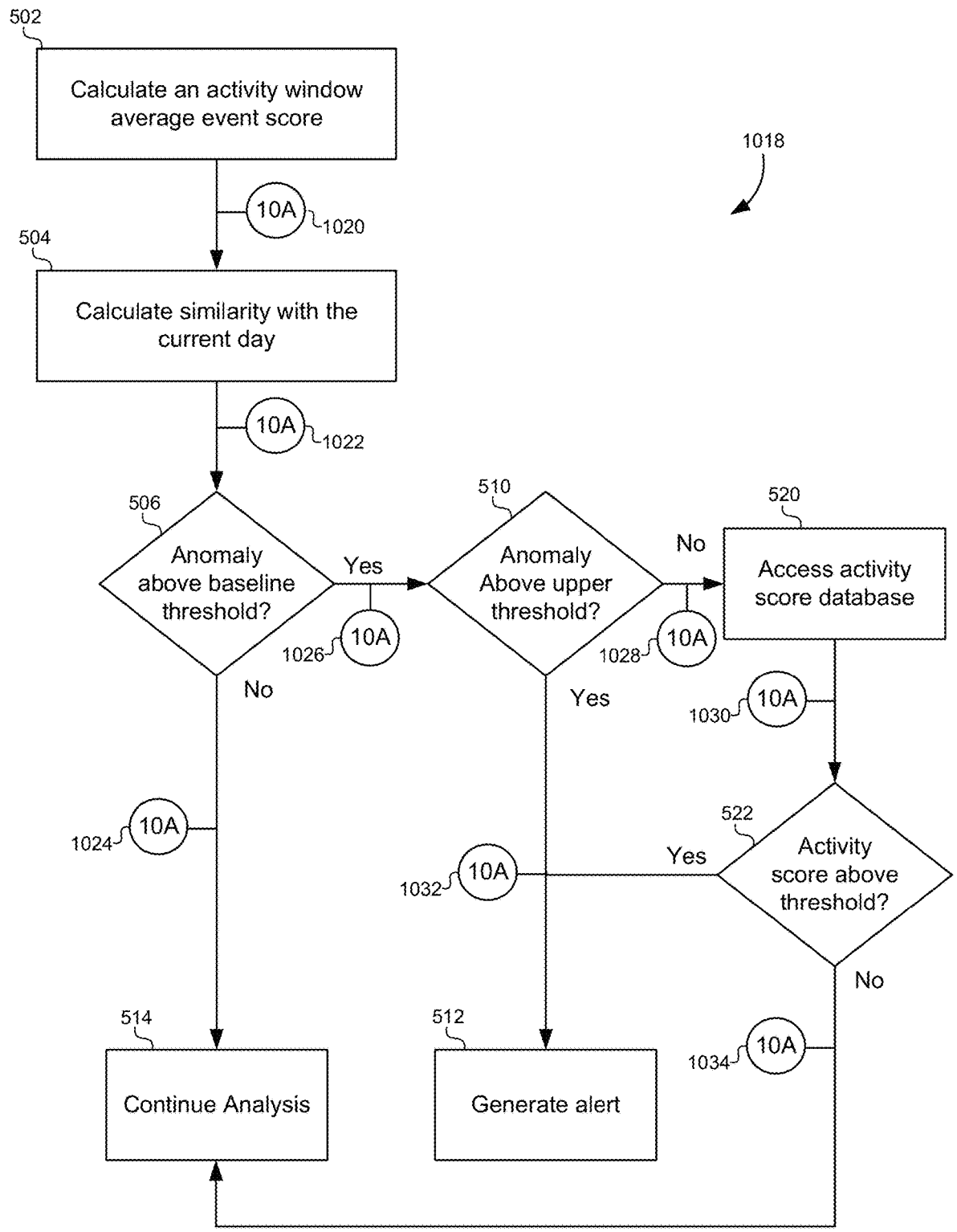
FIG. 10B illustrates a flowchart 1018 of a method for executing a bot versus human determination at different stages in a cloud security system, according to some embodiment.

FIG. 10B illustrates a flowchart 1018 of a method for executing a bot versus human determination at different stages in a cloud security system, according to some embodiment. In this figure, each instance of the circle labeled as "10A" indicates that the entropy-based bot determination of FIG. 10A may be executed. Flowchart 1018 may be a combination of the flowcharts in FIGS. 5A-5B. Flowchart 1018 illustrates different locations where the entropy-based bot determination may augment the system described above.

After calculating the average window event score (502), the system may detect a bot (1020) to determine whether additional processing is even necessary. After calculating the similarity between the current time interval and the event score of the window (504), the system may detect a bot (1022) to adjust the baseline threshold and/or the upper threshold. These thresholds may also be adjusted (1026), (1028) at other stages of the security pipeline to adjust the thresholds when bot activity is detected. Generally, thresholds may be lowered when bot activity is detected, as it is more likely to be a threat. Recall from above that the bot activity detected is specifically malicious bot activity and not authorized bot activity. These are distinguished based on the entropy threshold as described above.

After evaluating various thresholds (506), (510), (522), the system may detect the bot (1024), (1032), (1034) to change the outcome from generating an alert (512) to instead continue the analysis (514) and vice versa. Generally, if malicious bot activity is detected and the result is to continue the analysis (514), the outcome may instead be changed to generate an alert (512). Alternatively, if a very low likelihood of bot activity is detected, then the outcome may be changed to continue the analysis (514) rather than generate an alert (512). For example, if the calculated entropy of the text string extracted from the action fails to exceed the entropy threshold by a predetermined amount, then the action may be rated as less likely to generate a threat than normal, thus changing the outcome of the process to instead continue the analysis (514).

It should be appreciated that the specific steps illustrated in FIGS. 10A-10B provide particular methods of detecting anomalous user behavior in a cloud environment according to various embodiments of the present invention. Other sequences of steps may also be performed according to alternative embodiments. For example, alternative embodiments of the present invention may perform the steps outlined above in a different order. Moreover, the individual steps illustrated in FIGS. 10A-10B may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 11:
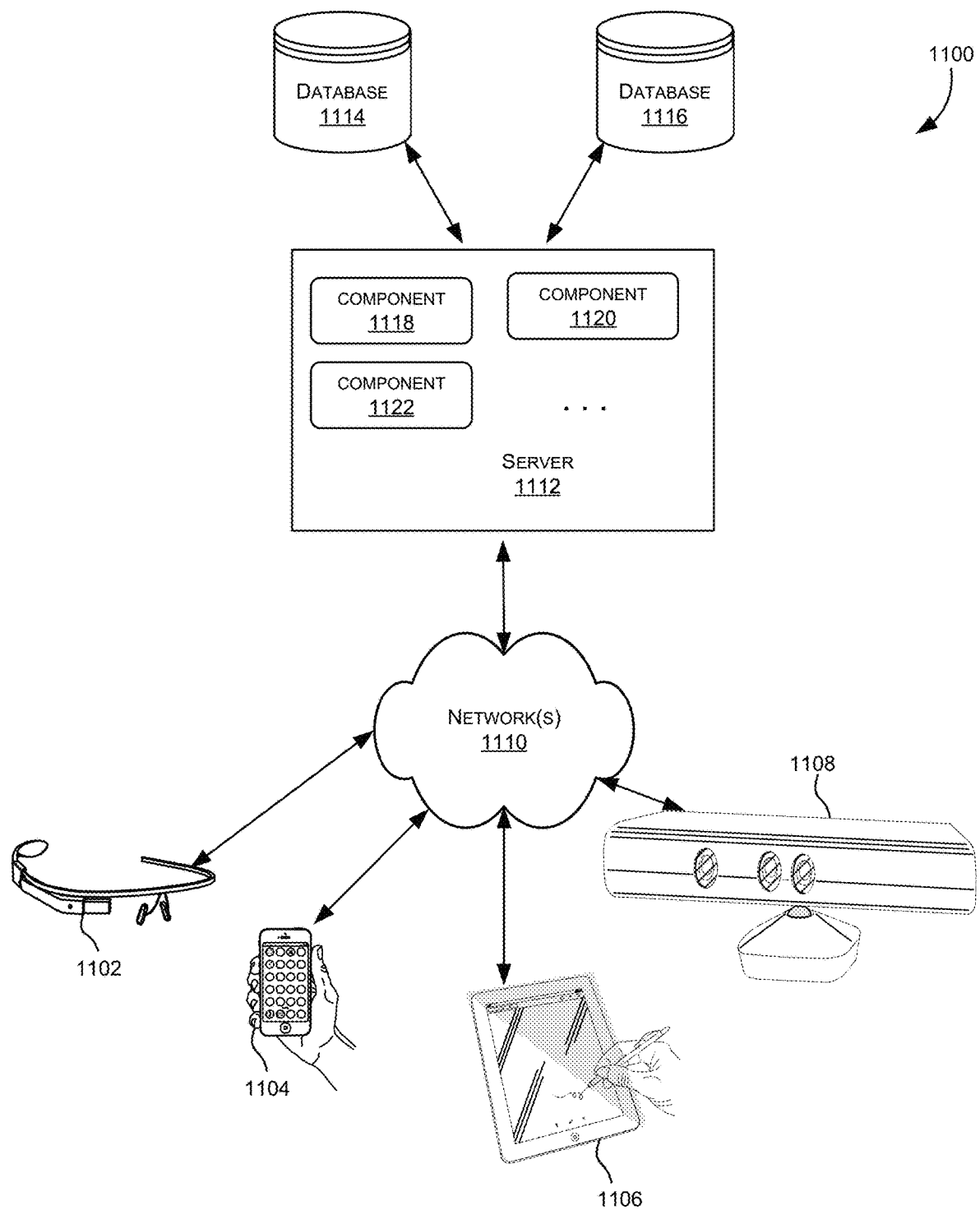
FIG. 11 illustrates a simplified block diagram of a distributed system for implementing some of the embodiments.

FIG. 11 depicts a simplified diagram of a distributed system 1100 for implementing one of the embodiments. In the illustrated embodiment, distributed system 1100 includes one or more client computing devices 1102, 1104, 1106, and 1108, which are configured to execute and operate a client application such as a web browser, proprietary client (e.g., Oracle Forms), or the like over one or more network(s) 1110. Server 1112 may be communicatively coupled with remote client computing devices 1102, 1104, 1106, and 1108 via network 1110.

In various embodiments, server 1112 may be adapted to run one or more services or software applications provided by one or more of the components of the system. In some embodiments, these services may be offered as web-based or cloud services or under a Software as a Service (SaaS) model to the users of client computing devices 1102, 1104, 1106, and/or 1108. Users operating client computing devices 1102, 1104, 1106, and/or 1108 may in turn utilize one or more client applications to interact with server 1112 to utilize the services provided by these components.

In the configuration depicted in the figure, the software components 1118, 1120 and 1122 of system 1100 are shown as being implemented on server 1112. In other embodiments, one or more of the components of system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in the figure is thus one example of a distributed system for implementing an embodiment system and is not intended to be limiting.

Client computing devices 1102, 1104, 1106, and/or 1108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1102, 1104, 1106, and 1108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1110.

Although exemplary distributed system 1100 is shown with four client computing devices, any number of client computing devices may be supported. Other devices, such as devices with sensors, etc., may interact with server 1112.

Network(s) 1110 in distributed system 1100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1110 can be a local area network (LAN), such as one based on Ethernet, Token-Ring and/or the like. Network(s) 1110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1112 may be adapted to run one or more services or software applications described in the foregoing disclosure. For example, server 1112 may correspond to a server for performing processing described above according to an embodiment of the present disclosure.

Server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1112 may include one or more applications to analyze and consolidate data feeds and/or event updates received from users of client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1112 may also include one or more applications to display the data feeds and/or real-time events via one or more display devices of client computing devices 1102, 1104, 1106, and 1108.

Distributed system 1100 may also include one or more databases 1114 and 1116. Databases 1114 and 1116 may reside in a variety of locations. By way of example, one or more of databases 1114 and 1116 may reside on a non-transitory storage medium local to (and/or resident in) server 1112. Alternatively, databases 1114 and 1116 may be remote from server 1112 and in communication with server 1112 via a network-based or dedicated connection. In one set of embodiments, databases 1114 and 1116 may reside in a storage-area network (SAN). Similarly, any necessary files for performing the functions attributed to server 1112 may be stored locally on server 1112 and/or remotely, as appropriate. In one set of embodiments, databases 1114 and 1116 may include relational databases, such as databases provided by Oracle, that are adapted to store, update, and retrieve data in response to SQL-formatted commands.

Figure 12:
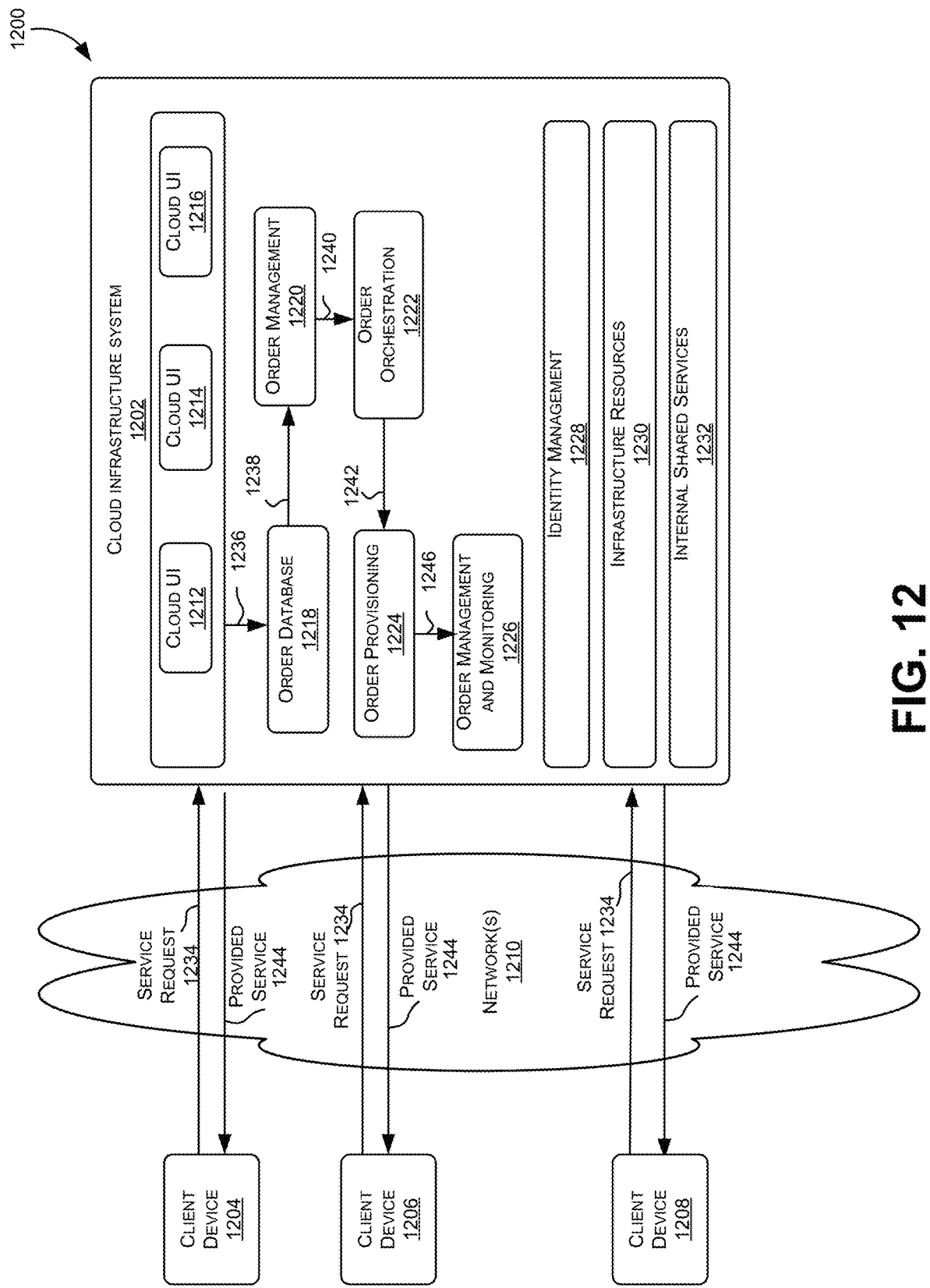
FIG. 12 illustrates a simplified block diagram of components of a system environment by which services provided by the components of an embodiment system may be offered as cloud services.

FIG. 12 is a simplified block diagram of one or more components of a system environment 1200 by which services provided by one or more components of an embodiment system may be offered as cloud services, in accordance with an embodiment of the present disclosure. In the illustrated embodiment, system environment 1200 includes one or more client computing devices 1204, 1206, and 1208 that may be used by users to interact with a cloud infrastructure system 1202 that provides cloud services. The client computing devices may be configured to operate a client application such as a web browser, a proprietary client application (e.g., Oracle Forms), or some other application, which may be used by a user of the client computing device to interact with cloud infrastructure system 1202 to use services provided by cloud infrastructure system 1202.

It should be appreciated that cloud infrastructure system 1202 depicted in the figure may have other components than those depicted. Further, the embodiment shown in the figure is only one example of a cloud infrastructure system that may incorporate an embodiment of the invention. In some other embodiments, cloud infrastructure system 1202 may have more or fewer components than shown in the figure, may combine two or more components, or may have a different configuration or arrangement of components.

Client computing devices 1204, 1206, and 1208 may be devices similar to those described above for 1102, 1104, 1106, and 1108.

Although exemplary system environment 1200 is shown with three client computing devices, any number of client computing devices may be supported. Other devices such as devices with sensors, etc. may interact with cloud infrastructure system 1202.

Network(s) 1210 may facilitate communications and exchange of data between clients 1204, 1206, and 1208 and cloud infrastructure system 1202. Each network may be any type of network familiar to those skilled in the art that can support data communications using any of a variety of commercially-available protocols, including those described above for network(s) 1110.

Cloud infrastructure system 1202 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1202 may be adapted to automatically provision, manage and track a customer's subscription to services offered by cloud infrastructure system 1202. Cloud infrastructure system 1202 may provide the cloud services via different deployment models. For example, services may be provided under a public cloud model in which cloud infrastructure system 1202 is owned by an organization selling cloud services (e.g., owned by Oracle) and the services are made available to the general public or different industry enterprises. As another example, services may be provided under a private cloud model in which cloud infrastructure system 1202 is operated solely for a single organization and may provide services for one or more entities within the organization. The cloud services may also be provided under a community cloud model in which cloud infrastructure system 1202 and the services provided by cloud infrastructure system 1202 are shared by several organizations in a related community. The cloud services may also be provided under a hybrid cloud model, which is a combination of two or more different models.

In some embodiments, the services provided by cloud infrastructure system 1202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1202. Cloud infrastructure system 1202 then performs processing to provide the services in the customer's subscription order.

In some embodiments, the services provided by cloud infrastructure system 1202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1202 may also include infrastructure resources 1230 for providing the resources used to provide various services to customers of the cloud infrastructure system. In one embodiment, infrastructure resources 1230 may include pre-integrated and optimized combinations of hardware, such as servers, storage, and networking resources to execute the services provided by the PaaS platform and the SaaS platform.

In some embodiments, resources in cloud infrastructure system 1202 may be shared by multiple users and dynamically re-allocated per demand. Additionally, resources may be allocated to users in different time zones. For example, cloud infrastructure system 1230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1232 may be provided that are shared by different components or modules of cloud infrastructure system 1202 and by the services provided by cloud infrastructure system 1202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1202, and the like.

In one embodiment, as depicted in the figure, cloud management functionality may be provided by one or more modules, such as an order management module 1220, an order orchestration module 1222, an order provisioning module 1224, an order management and monitoring module 1226, and an identity management module 1228. These modules may include or be provided using one or more computers and/or servers, which may be general purpose computers, specialized server computers, server farms, server clusters, or any other appropriate arrangement and/or combination.

In exemplary operation 1234, a customer using a client device, such as client device 1204, 1206 or 1208, may interact with cloud infrastructure system 1202 by requesting one or more services provided by cloud infrastructure system 1202 and placing an order for a subscription for one or more services offered by cloud infrastructure system 1202. In certain embodiments, the customer may access a cloud User Interface (UI), cloud UI 1212, cloud UI 1214 and/or cloud UI 1216 and place a subscription order via these UIs. The order information received by cloud infrastructure system 1202 in response to the customer placing an order may include information identifying the customer and one or more services offered by the cloud infrastructure system 1202 that the customer intends to subscribe to.

After an order has been placed by the customer, the order information is received via the cloud UIs, 1212, 1214 and/or 1216.

At operation 1236, the order is stored in order database 1218. Order database 1218 can be one of several databases operated by cloud infrastructure system 1218 and operated in conjunction with other system elements.

At operation 1238, the order information is forwarded to an order management module 1220. In some instances, order management module 1220 may be configured to perform billing and accounting functions related to the order, such as verifying the order, and upon verification, booking the order.

At operation 1240, information regarding the order is communicated to an order orchestration module 1222. Order orchestration module 1222 may utilize the order information to orchestrate the provisioning of services and resources for the order placed by the customer. In some instances, order orchestration module 1222 may orchestrate the provisioning of resources to support the subscribed services using the services of order provisioning module 1224.

In certain embodiments, order orchestration module 1222 enables the management of business processes associated with each order and applies business logic to determine whether an order should proceed to provisioning. At operation 1242, upon receiving an order for a new subscription, order orchestration module 1222 sends a request to order provisioning module 1224 to allocate resources and configure those resources needed to fulfill the subscription order. Order provisioning module 1224 enables the allocation of resources for the services ordered by the customer. Order provisioning module 1224 provides a level of abstraction between the cloud services provided by cloud infrastructure system 1200 and the physical implementation layer that is used to provision the resources for providing the requested services. Order orchestration module 1222 may thus be isolated from implementation details, such as whether or not services and resources are actually provisioned on the fly or pre-provisioned and only allocated/assigned upon request.

At operation 1244, once the services and resources are provisioned, a notification of the provided service may be sent to customers on client devices 1204, 1206 and/or 1208 by order provisioning module 1224 of cloud infrastructure system 1202.

At operation 1246, the customer's subscription order may be managed and tracked by an order management and monitoring module 1226. In some instances, order management and monitoring module 1226 may be configured to collect usage statistics for the services in the subscription order, such as the amount of storage used, the amount data transferred, the number of users, and the amount of system up time and system down time.

In certain embodiments, cloud infrastructure system 1200 may include an identity management module 1228. Identity management module 1228 may be configured to provide identity services, such as access management and authorization services in cloud infrastructure system 1200. In some embodiments, identity management module 1228 may control information about customers who wish to utilize the services provided by cloud infrastructure system 1202. Such information can include information that authenticates the identities of such customers and information that describes which actions those customers are authorized to perform relative to various system resources (e.g., files, directories, applications, communication ports, memory segments, etc.) Identity management module 1228 may also include the management of descriptive information about each customer and about how and by whom that descriptive information can be accessed and modified.

Figure 13:
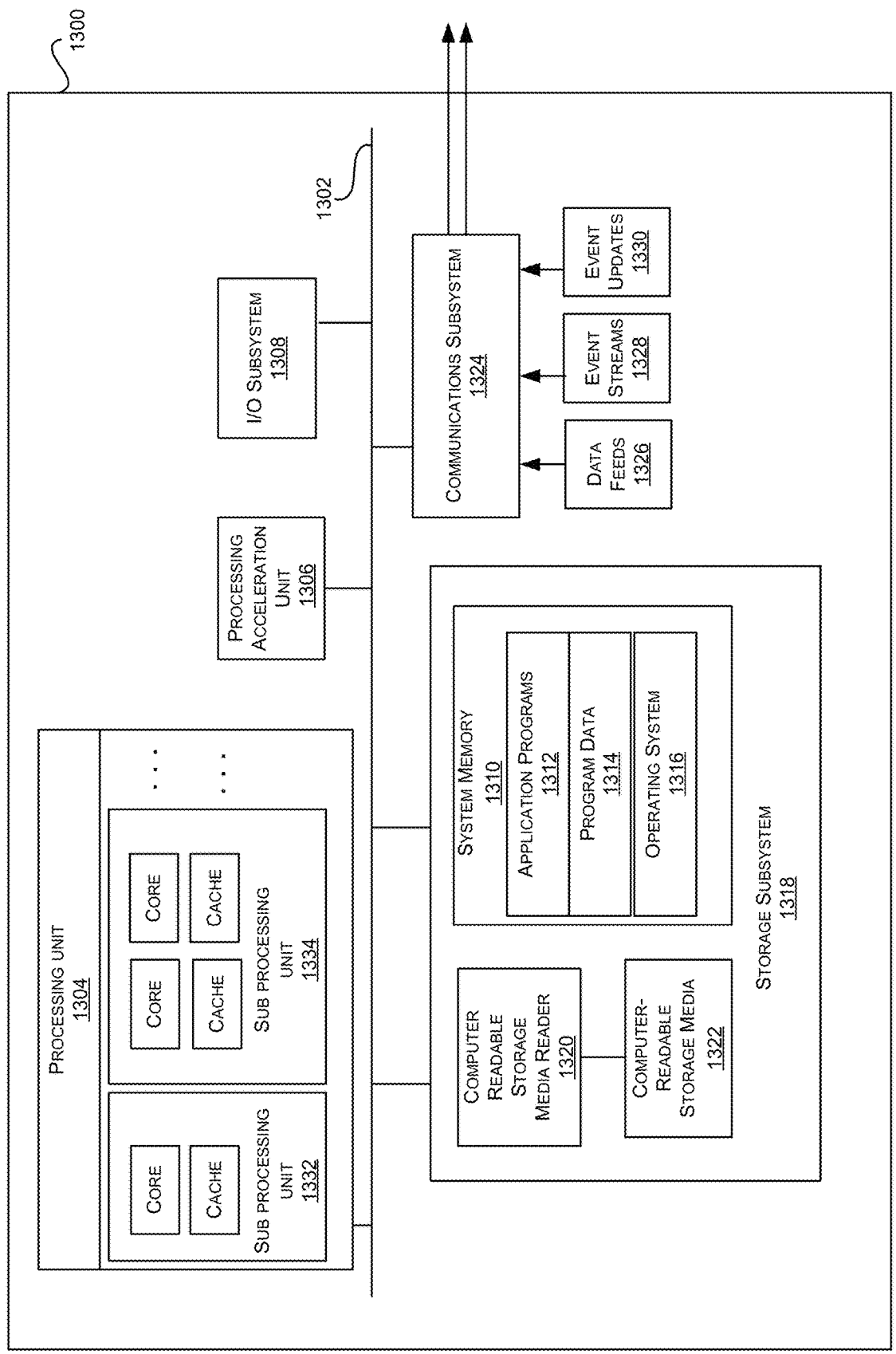
FIG. 13 illustrates an exemplary computer system, in which various embodiments may be implemented.

FIG. 13 illustrates an exemplary computer system 1300, in which various embodiments of the present invention may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that comprises software elements, shown as being currently located within a system memory 1310. System memory 1310 may store program instructions that are loadable and executable on processing unit 1304, as well as data generated during the execution of these programs.

Depending on the configuration and type of computer system 1300, system memory 1310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1304. In some implementations, system memory 1310 may include multiple different types of memory, such as static random access memory (SRAM) or dynamic random access memory (DRAM). In some implementations, a basic input/output system (BIOS), containing the basic routines that help to transfer information between elements within computer system 1300, such as during start-up, may typically be stored in the ROM. By way of example, and not limitation, system memory 1310 also illustrates application programs 1312, which may include client applications, Web browsers, mid-tier applications, relational database management systems (RDBMS), etc., program data 1314, and an operating system 1316. By way of example, operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1318 may also provide a tangible computer-readable storage medium for storing the basic programming and data constructs that provide the functionality of some embodiments. Software (programs, code modules, instructions) that when executed by a processor provide the functionality described above may be stored in storage subsystem 1318. These software modules or instructions may be executed by processing unit 1304. Storage subsystem 1318 may also provide a repository for storing data used in accordance with the present invention.

Storage subsystem 1300 may also include a computer-readable storage media reader 1320 that can further be connected to computer-readable storage media 1322. Together and, optionally, in combination with system memory 1310, computer-readable storage media 1322 may comprehensively represent remote, local, fixed, and/or removable storage devices plus storage media for temporarily and/or more permanently containing, storing, transmitting, and retrieving computer-readable information.

Computer-readable storage media 1322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1300.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have beeen described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of distinguishing between human and computer actions in cloud environments, the method comprising:

receiving a list of one or more actions from a cloud environment, wherein the list of one or more actions are recorded by the cloud environment and sent to a server that monitors security for a plurality of different cloud environments;

identifying a text string in the list of one or more actions, wherein the text string is received by the cloud environment as part of a request from a client device;

calculating an entropy value for the text string;

comparing the entropy value to a predetermined threshold;

determining whether the text string is bot-generated if the entropy value exceeds the predetermined threshold; and determining whether to generate an alert based at least in part on a result of determining whether the text string is bot-generated.

2. The method of claim 1, wherein the entropy value of the text string is calculated by calculating a probability of occurrence for each token in the text string.

3. The method of claim 2, wherein the entropy value of the text string is further calculated by calculating the base-2 logarithm of the probability of occurrence for each token in the text string.

4. The method of claim 3, wherein the entropy value of the text string is further calculated by multiplying a result of the base-2 logarithm by the probability of occurrence for each token in the text string.

5. The method of claim 4, wherein the entropy value of the text string is further calculated by aggregating results of multiplying the base-2 logarithm by the probability of occurrence to generate an overall entropy measure for the text string.

6. The method of claim 1, wherein identifying the text string in the list of one or more actions comprises extracting a substring from a request in at least one of the one or more actions.

7. The method of claim 1, wherein identifying the text string in the list of one or more actions comprises removing text from a white list of common text from the text string before calculating the entropy value.

8. The method of claim 1, wherein identifying the text string in the list of one or more actions comprises combining text strings from each of the list of one or more actions together to form the text string.

9. A non-transitory computer-readable medium comprising instructions that, when executed by one or more processors, cause the one or more processors to perform operations comprising:

receiving a list of one or more actions from a cloud environment, wherein the list of one or more actions are recorded by the cloud environment and sent to a server that monitors security for a plurality of different cloud environments;

identifying a text string in the list of one or more actions, wherein the text string is received by the cloud environment as part of a request from a client device;

calculating an entropy value for the text string;

comparing the entropy value to a predetermined threshold;

determining whether the text string is bot-generated if the entropy value exceeds the predetermined threshold; and determining whether to generate an alert based at least in part on a result of determining whether the text string is bot-generated.

10. The non-transitory computer-readable medium of claim 9, wherein the predetermined threshold is determined based on a type of the one or more actions.

11. The non-transitory computer-readable medium of claim 9, wherein the predetermined threshold is determined based on a rate at which the one or more actions occur.

12. The non-transitory computer-readable medium of claim 9, wherein the predetermined threshold is determined based on a type of resource on which the one or more actions are performed.

13. The non-transitory computer-readable medium of claim 9, wherein determining whether the text string is bot-generated based at least in part on the entropy value comprises:

providing the list of one or more actions and the entropy value to a neural network; and receiving an output of the neural network indicating whether the text string is bot-generated.

14. The non-transitory computer-readable medium of claim 9, wherein the operations further comprise altering a baseline threshold used to detect threats in the cloud environment based on the entropy value.

15. The non-transitory computer-readable medium of claim 14, wherein the operations further comprise altering an upper threshold used to detect threats in the cloud environment based on the entropy value.

16. A system comprising:

one or more processors; and one or more memory devices comprising instructions that, when executed by the one or more processors, cause the one or more processors to perform operations comprising:

receiving a list of one or more actions from a cloud environment, wherein the list of one or more actions are recorded by the cloud environment and sent to a server that monitors security for a plurality of different cloud environments;

identifying a text string in the list of one or more actions, wherein the text string is received by the cloud environment as part of a request from a client device;

calculating an entropy value for the text string;

comparing the entropy value to a predetermined threshold;

determining whether the text string is bot-generated if the entropy value exceeds the predetermined threshold; and determining whether to generate an alert based at least in part on a result of determining whether the text string is bot-generated.

17. The system of claim 16, wherein the operations further comprise determining that the one or more actions are executed against a same resource.

18. The system of claim 16, wherein the operations further comprise determining that the one or more actions are executed by a same user.

19. The system of claim 16, wherein determining whether to generate the alert comprises:

determining that the system had determined not to generate the alert based on a similarity score being compared to a baseline threshold and an upper threshold; and causing the system to generate the alert based on the entropy value.

20. The non-transitory computer-readable medium of claim 9, wherein the text string comprises a random text string generated by a bot.

\* \* \* \* \*

UNITED STATES PATENT AND TRADEMARK OFFICE
CERTIFICATE OF CORRECTION

PATENT NO. : 11,288,111 B2
APPLICATION NO. : 16/750863
DATED : March 29, 2022
INVENTOR(S) : Xu et al.

Page 1 of 1

It is certified that error appears in the above-identified patent and that said Letters Patent is hereby corrected as shown below:

In the Drawings

On sheet 2 of 19, in FIG. 1B, Line 3, delete "appliead" and insert -- applied --, therefor.

On sheet 2 of 19, in FIG. 1B, Line 4, delete "infractructure" and insert -- infrastructure --, therefor.

In the Specification

In Column 2, Line 31, delete "may included" and insert -- may be included --, therefor.

In Column 5, Line 61, delete "ransomeware" and insert -- ransomware --, therefor.

In Column 6, Line 55, delete "passwords only)," and insert -- passwords only, --, therefor.

In Column 19, Line 19, after "2.72548" insert -- . --.

In Column 31, Line 37, delete "Web browsers," and insert -- web browsers, --, therefor.

In Column 32, Line 52, delete "evolution)," and insert -- evolution)), --, therefor.

Signed and Sealed this
Sixth Day of September, 2022

Katherine Kelly Vidal
*Director of the United States Patent and Trademark Office*